US010472060B2

(12) United States Patent
Mackin et al.

(10) Patent No.: US 10,472,060 B2
(45) Date of Patent: Nov. 12, 2019

(54) METHODS AND APPARATUS TO MONITOR A SHOCK WAVE PROXIMATE A TRANSONIC SURFACE

(71) Applicant: The Boeing Company, Chicago, IL (US)

(72) Inventors: Steve G. Mackin, Bellevue, WA (US); Jason J. Jackowski, Everett, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 15/428,767

(22) Filed: Feb. 9, 2017

(65) Prior Publication Data

US 2019/0291884 A1  Sep. 26, 2019

(51) Int. Cl.
*B64C 15/00* (2006.01)
*B64C 30/00* (2006.01)
*B64C 3/14* (2006.01)

(52) U.S. Cl.
CPC ........ *B64C 30/00* (2013.01); *B64C 2003/149* (2013.01)

(58) Field of Classification Search
None
See application file for complete search history.

(56) References Cited

U.S. PATENT DOCUMENTS

| 2005/0017126 A1* | 1/2005 | McLean | B64C 3/28 244/35 A |
| 2012/0186337 A1* | 7/2012 | Guichard | B64D 43/02 73/204.23 |
| 2016/0252603 A1* | 9/2016 | Kelchner | G01M 9/06 701/14 |
| 2017/0137116 A1* | 5/2017 | Ireland | B64C 23/06 |

OTHER PUBLICATIONS

Raghunath et al., "Visualization of Supersonic Flows in Shock Tunnels, Using the Background Oriented Schlieren Technique," Paper 10, American Institute of Aeronautics and Astronautics, Australian Aerospace Student Conference 2004, University of Sydney, on Dec. 12, 2004, 8 pages.

* cited by examiner

*Primary Examiner* — Richard G Davis
(74) *Attorney, Agent, or Firm* — Hanley, Flight & Zimmerman, LLC

(57) ABSTRACT

Methods, apparatus, and articles of manufacture to monitor a shock wave proximate a surface of an aircraft are disclosed. An example apparatus includes a first camera at a first location on an aircraft to capture a first image of a surface of the aircraft during a first time period, and capture a second image of the surface during a second time period, a second camera at a second location to capture a third image of the surface during the first time period, and capture a fourth image of the surface during the second time period. The example apparatus further includes a position calculator to identify a first position of a shock wave based on the first and third images, and a second position based on the second and fourth images, and calculate a difference between the first and the second positions, and a command generator to generate a command to control at least one of an actuator and a control surface based on the difference.

20 Claims, 14 Drawing Sheets

METHODS AND APPARATUS TO MONITOR A SHOCK WAVE PROXIMATE A TRANSONIC SURFACE

FIELD OF THE DISCLOSURE

This disclosure relates generally to aircraft and, more particularly, to methods and apparatus to monitor a shock wave proximate a transonic surface.

BACKGROUND

When traveling at transonic speeds, many aircraft employ actuators (e.g., dynamic surfaces, engines, etc.) to reduce drag and enhance aerodynamic properties. The aircraft may adjust control surfaces such as, for example, flaps and slats operatively coupled to an aircraft wing, or elevators or rudders operatively coupled to an aircraft tail, to compensate for effects of transonic airflow. The aircraft may adjust the dynamic surfaces and/or a parameter of one or more engines of the aircraft to mitigate an effect of a shock wave.

SUMMARY

Methods, apparatus, and articles of manufacture to monitor a shock wave proximate a surface of an aircraft are disclosed. An example apparatus includes a first camera at a first location on an aircraft to capture a first image of a surface of the aircraft during a first time period, and capture a second image of the surface during a second time period, and a second camera at a second location on the aircraft to capture a third image of the surface during the first time period, and capture a fourth image of the surface during the second time period. The apparatus further includes a position calculator to identify a first position of a shock wave proximate the surface based on the first and third images, identify a second position of the shock wave proximate the surface based the second and fourth images, and calculate a difference between the first and the second positions. The apparatus further includes a command generator to generate a command to control at least one of an actuator or a control surface based on the difference.

An example method includes capturing a first image of a surface of an aircraft during a first time period via a first camera at a first location on the aircraft, capturing a second image of the surface during the first time period via a second camera at a second location on the aircraft, and identifying a first position of a shock wave proximate the surface based on the first and second images. The method further includes capturing a third image of the surface during a second time period via the first camera, capturing a fourth image of the surface during a second time period via the second camera, and identifying a second position of the shock wave proximate the surface based on the third and fourth images. The method further includes calculating a difference between the first and the second positions, and generating a command to control at least one of an actuator or a control surface based on the difference.

An example tangible computer-readable storage medium includes instructions that, when executed, cause a machine to at least capture a first image of a surface of an aircraft during a first time period via a first camera at a first location on the aircraft, capture a second image of the surface during the first time period via a second camera at a second location on the aircraft, and identify a first position of a shock wave proximate the surface based on the first and second images. The example tangible computer-readable storage medium further includes instructions that, when executed, cause the machine to at least capture a third image of the surface during a second time period via the first camera, capture a fourth image of the surface during a second time period via the second camera, identify a second position of the shock wave proximate the surface based on the third and fourth images, calculate a difference between the first and the second positions, and generate a command to control at least one of an actuator or a control surface based on the difference.

Figure 1:
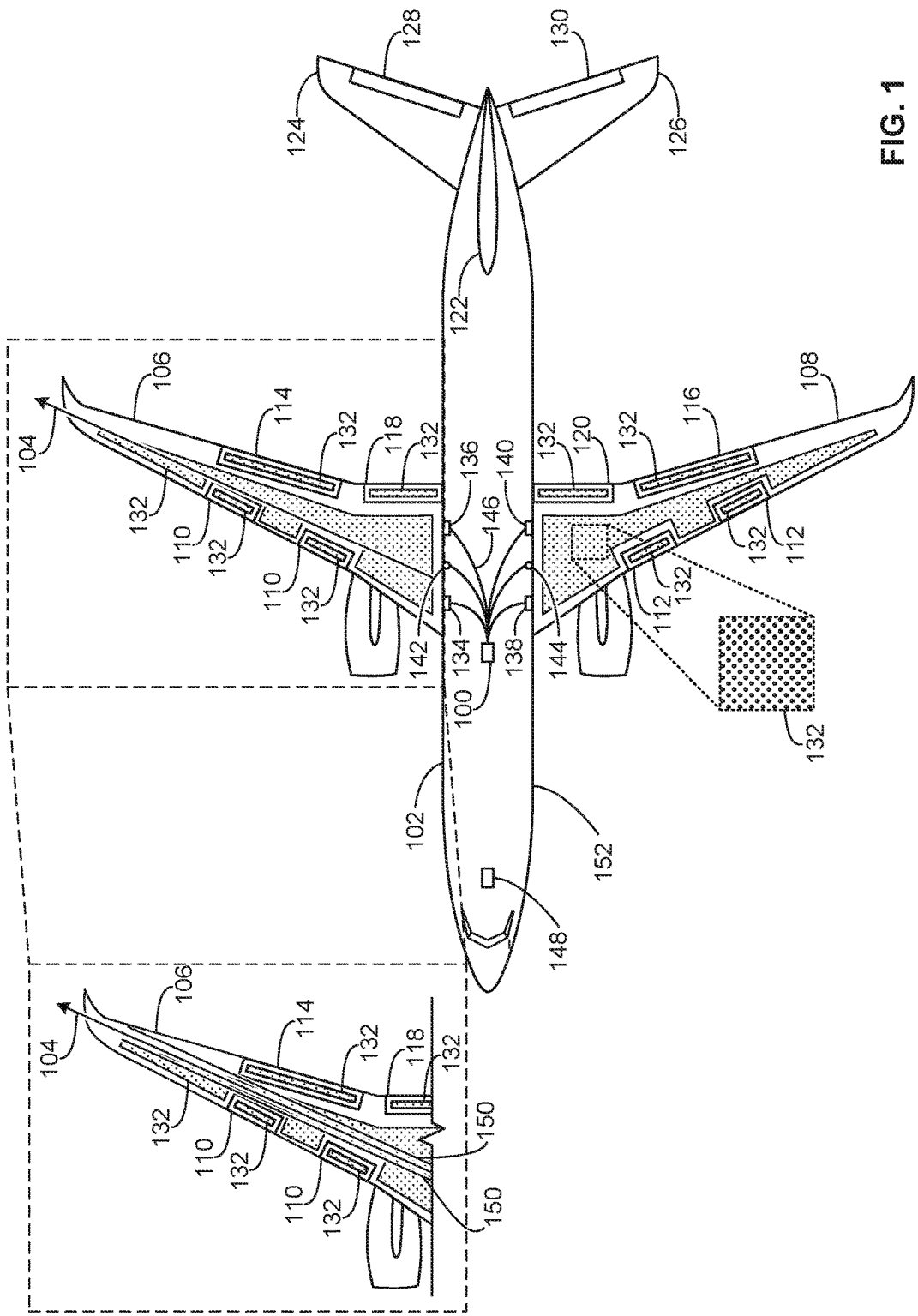
FIG. 1 is a schematic illustration of an example shock wave manager apparatus coupled to an example aircraft monitoring a shock wave proximate a wing of the aircraft.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

Typical aircraft can travel at transonic speeds. Transonic refers to a condition of flight in which a range of velocities of airflow exist surrounding and flowing past an aircraft or an airfoil of the aircraft such that these airflows are concurrently below, at, and above the speed of sound in the range of Mach 0.8 to Mach 1.2. Transonic airflow is dependent not only on the speed of the aircraft, but also on a temperature of the airflow proximate the aircraft. Transonic speeds may range from a critical Mach number of the aircraft (e.g., Mach 0.8) to speeds above the speed of sound (e.g., Mach 1.2). For example, the aircraft may have a transonic speed range from Mach 0.8 to Mach 1.2 due to the aerodynamic properties of the aircraft. As the aircraft increases speed, the amount of airflow over the aircraft and/or a surface (e.g., an airfoil, a control surface, an engine, etc.) of the aircraft becomes increasingly supersonic.

A critical Mach number of an aircraft may be determined based on the lowest Mach number at which airflow over some portion of the aircraft reaches the speed of sound, but the airspeed of the aircraft does not exceed the speed of sound (e.g., an airspeed less than Mach 1.0). The aircraft traveling at the critical Mach number may produce a weak shock wave. However, as the aircraft travels at airspeeds greater than the critical Mach number, a drag coefficient, and an amount of drag of the aircraft quickly increases. The aircraft traveling at airspeeds concurrently below, at, or above the speed of sound (e.g., airspeeds at Mach 0.8 to Mach 1.2) may produce significantly stronger shock waves.

An aircraft traveling at an airspeed beyond a critical Mach number of the aircraft may catch up to a pressure wave created by the aircraft. For example, an aircraft traveling at a transonic speed may encounter airflow traveling at subsonic speeds. When the aircraft encounters the subsonic airflow, a shock wave forms. For example, the shock wave may form at the boundary between subsonic airflow and supersonic airflow. The shock wave may travel spanwise along a leading-edge of a surface such as, for example, a wing of the aircraft (e.g., the shock wave may form perpendicular to the airflow). The shock wave forms on an upper surface of the wing and forms an additional area of supersonic flow along with another shock wave on the lower surface of the wing. As the aircraft travels at faster speeds (e.g., approaching or exceeding the speed of sound), the areas of supersonic airflow enlarge and the shock waves move further spanwise nearer the trailing edge. As the shock waves become stronger and the areas of supersonic airflow enlarge, the shock waves become increasingly visible. For example, the shock waves may be visible traveling spanwise along the wing of the aircraft, traveling spanwise along a surface of an engine, traveling spanwise along a control surface (e.g., an aileron, an elevator, etc.), etc.

Example shock wave manager apparatus disclosed herein are operative to monitor a position and/or a strength of a shock wave. The example shock wave manager apparatus may be used to capture an image of a shock wave proximate a surface of an aircraft using a camera coupled to a surface of an aircraft (e.g., a fuselage, a horizontal stabilizer, etc.). The surface of the aircraft may be a surface of an actuator such as, for example, an engine, a propeller, a rotor blade, etc. The surface of the aircraft may be a control surface such as, for example, a surface of an aileron, an elevator, a flap, a horizontal stabilizer, a rudder, a slat, a vertical stabilizer, etc. The camera may be a high-speed digital camera (e.g., an electronic camera with a high shutter speed). Additionally or alternatively, the camera may capture images in the infrared and/or the ultraviolet spectrum. The shock wave manager apparatus may use more than one camera to capture images of the shock wave to produce, for example, a three-dimensional (3-D) image of the shock wave.

Some disclosed example shock wave manager apparatus disclosed herein employ background-oriented schlieren (BOS) techniques to characterize a shock wave. BOS techniques include utilizing a background pattern (e.g., a randomly generated dot-pattern), a light source (e.g., a strobe light source), and one or more cameras (e.g., high speed digital cameras) to visualize density gradients (e.g., shock waves). For example, the shock wave manager apparatus may employ BOS techniques to determine a position and/or a strength of a shock wave proximate a surface of an aircraft. The example shock wave manager apparatus may (1) capture a first image with a camera, where the first image includes a surface of an aircraft when no shock waves are present; (2) capture a second image with the camera, where the second image includes the surface of the aircraft when shock waves are present; (3) compare the first image to the second image to determine a difference (e.g., a density field difference); (4) determine whether the difference satisfies a threshold (e.g., the difference is greater than 0.2 kg/m$^3$); and (5) calculate a position and/or a strength of the shock waves based on the difference and/or whether the difference satisfies the threshold.

The example shock wave manager apparatus may calculate a position and/or a strength of a shock wave based on a difference between densities (e.g., air density fields) of two mediums. A first medium may be air proximate a pattern coupled to a surface of an aircraft. A second medium may be air proximate one or more cameras at a distance from the surface. When no shock waves are present (e.g., during a baseline process), a first density of air in the first medium and a second density of air in the second medium are approximately equivalent. Correspondingly, a first refractive index of light for the first medium and a second refractive index of light for the second medium are approximately equivalent. Thus, the approximately equivalent densities of air do not distort an image of the pattern captured by the one or more cameras. For example, an undistorted image may include geometric shapes and/or color patches of the pattern identified at a first position.

When a shock wave is present, the first density of air in the first medium and the second density of air in the second medium are different, and, consequently, the first and the second refractive indices of light for the first and the second mediums are different. The density of air in the second medium may distort the image of the pattern because of altering a path of light rays as the light rays travel through the shock wave, where the shock wave is proximate the pattern. For example, a distorted image may include the geometric shapes and/or the color patches of the pattern identified at a second position, where the second position is different than the first position. Therefore, the example shock wave manager apparatus may determine a presence and a location of the shock wave proximate the pattern coupled to the surface of the aircraft based on the difference between the densities of the first and the second mediums, the refractive indices of the first and the second mediums, the position differences of the geometric shapes and/or the color patches, etc. The example shock wave manager apparatus may identify a set of coordinates (e.g., in a 3-D coordinate space in a computer imaging system) for one or more portions of the shock wave, or the shock wave in its entirety, based on the outputs of the BOS techniques as described above. The example shock wave manager apparatus may utilize the set of coordinates of the shock wave to perform calculations, comparisons, etc. with respect to additional shock waves (e.g., a shock wave on an opposite side of the aircraft, a shock wave as a result of a different flight condition of the aircraft, etc.).

In some examples, the background pattern has a high contrast of black and white regions. Additionally or alternatively, any other colored regions may be used. The regions of the background pattern include features (e.g., geometric shapes) that are dependent upon imaging geometry of the setup of the camera(s), capabilities of the camera(s), as well as ambient flow conditions in a medium of interest (e.g., air above a surface of an aircraft). In some examples, the background pattern is a speckled pattern. The speckled pattern is a pattern covered or marked with small geometric shapes (e.g., small dots) and/or patches of color (e.g., black regions, white regions, etc.).

In some examples, the background pattern (e.g., the speckled pattern) is random. For example, a computing device may randomly generate the background pattern (e.g., prior to installing the background pattern on the surface of the aircraft). The computing device may calculate spacing requirements between the individual geometric shapes and/or the individual patches of color. For example, the computing device may determine a first position for a first dot within a resolution size of the camera imaging system (e.g., a 5×5 pixel grid) such that the first position does not interfere with a second dot at a second position, where the second position does not overlap the first position even when experiencing a shock wave.

Some disclosed example shock wave manager apparatus disclosed herein characterize a shock wave based on a baseline image capturing process. The example shock wave manager apparatus may capture one or more images with one or more cameras of a pattern coupled to (e.g., adhered to, glued to, painted on, etc.) a surface of an aircraft when the aircraft is not in flight. For example, a speckled pattern may be glued to the surface of a wing of the aircraft. Additionally or alternatively, any other type of pattern may be used. The example shock wave manager apparatus may capture one or more images of the aircraft surface of interest (e.g., the pattern coupled to the aircraft wing, etc.) when the aircraft surface is not experiencing shock waves. For example, the aircraft may be taxiing to or from an airport terminal gate, parked at the airport terminal gate, etc.

Alternatively, the example shock wave manager apparatus may capture an image of the pattern coupled to the aircraft surface when the aircraft is flying in non-shock wave or weak-shock wave producing conditions. For example, the aircraft may be flying at an air speed that does not produce a shock wave (e.g., taking off from a runway) or at an air speed that produces a weak shock wave (e.g., flying the aircraft at a speed such that airflows are concurrently below a critical Mach number of the aircraft). During the baseline process, a local density of air proximate the pattern may be approximately equivalent to a local density of air proximate the camera. The comparable local densities may result in undistorted images of the pattern as captured by the camera(s). The images captured during the baseline process are referred to herein as reference images.

Some disclosed example shock wave manager apparatus disclosed herein process reference images captured during a baseline process. For example, the example shock wave manager apparatus may segment a pattern coupled to a surface of an aircraft into subdivisions. The subdivisions may include one or more geometric shapes and/or color patches (e.g., one or more circles of a randomly-distributed pattern of circles) of a pattern coupled (e.g., glued, painted, etc.) to the surface as described above. The example shock wave manager apparatus may determine a position of a subdivision, a distance between two subdivisions, etc. The example shock wave manager apparatus may determine the positions and/or the distances for a plurality of the subdivisions. The example shock wave manager apparatus may store the positions and/or the distances in a database.

Some disclosed example shock wave manager apparatus disclosed herein may determine a position and/or a strength of a shock wave based on calculating a deformation of a surface of an aircraft (e.g., a wing, a horizontal stabilizer, etc.). For example, a lift-producing surface (e.g., a wing) of an aircraft may deform during flight as the lift-producing surface bears a portion of a weight of the aircraft. The lift-producing surface may deform to varying degrees based on a flight condition of the aircraft (e.g., the deformation may increase with air speed, elevation, etc.). A flight condition of the aircraft may include a parameter corresponding to a current action of the aircraft. For example, a flight condition of the aircraft may be an angle of attack, an airspeed, an altitude, a total air temperature surrounding the aircraft, etc. The flight condition of the aircraft may include a parameter corresponding to an actuator and/or a control surface of the aircraft. For example, the flight condition of the aircraft may be an air intake of an engine, an engine speed, a position of an aileron, an elevator, a slat, etc. The flight condition of the aircraft may be measured by a sensor.

A pattern coupled to a lift-producing surface may deform along with the lift-producing surface. The BOS techniques described above may produce erroneous shock wave characterizations because of the deformation. In some examples, the shock wave manager apparatus compensates for a deformation of a surface of an aircraft by using a deformation compensation technique. An example deformation compensation technique is obtaining an expected degree of deformation from a pre-defined (e.g., pre-populated) table. The expected degree of deformation may be based on a flight condition and stored in a look-up table (e.g., an a priori table) in a database. For example, the shock wave manager apparatus may obtain a flight condition of the aircraft and determine the corresponding degree of deformation of the surface from a look-up table. The example shock wave manager apparatus may use the expected degree of deformation to adjust a characterization of the shock wave as calculated by the BOS techniques as described above.

Another example deformation compensation technique is fiber optic shape sensing (FOSS). FOSS techniques utilize one or more fiber optic sensors that use optical fiber as a sensing element (e.g., an intrinsic sensor) to measure pressure, temperature, strain, etc. Optical fiber may be embedded into one or more surfaces of an aircraft (e.g., a wing, a horizontal stabilizer, etc.). The example shock wave manager apparatus may use one or more FOSS techniques to map a range of strain values to modulated values of intensity, phase, polarization, wavelength, light transit time, etc. For example, the shock wave manager apparatus may determine that a calculated wavelength of light in the optical fiber corresponds to a degree of deformation. The example shock wave manager apparatus may use the degree of deformation to adjust a characterization of the shock wave as calculated by the BOS techniques as described above.

Yet another example deformation compensation technique is photogrammetry. Photogrammetry is an example mapping method where a measurement may be taken from one or more images. For example, photogrammetry in its simplest form may determine a distance between two points (e.g., a distance between a camera lens and a surface of an aircraft), where the two points lie on a plane parallel to the image plane of the images, by measuring the distance on the image. The distance may be determined if the scale of the image is known and, therefore, the distance may be calculated by multiplying the measured distance on the image by 1/s, where s is the scale of the image.

The example shock wave manager apparatus may utilize photogrammetry techniques using one camera to calculate a deformation by comparing (1) an image of a surface of an aircraft where shock waves are not present to (2) an image of the surface of the aircraft where shock waves are present. For example, the shock wave manager apparatus may capture a first image (e.g., a reference image) with a camera of the surface where shock waves are not present. The example shock wave manager apparatus may determine a first position of a dot of a pattern coupled to the surface based on the first image. The example shock wave manager apparatus may capture a second image (e.g., an operational image) with the camera of the surface where shock waves are present. The example shock wave manager apparatus may determine a second position of the dot based on the second image. The example shock wave manager apparatus may compare the first and the second positions of the dot to determine a position difference. The example shock wave manager apparatus may map the position difference to a degree of deformation of the surface to calculate the deformation. The example shock wave manager apparatus may then use the calculated deformation to adjust a characterization of a shock wave measured by BOS techniques as described above.

The example shock wave manager apparatus may utilize photogrammetry techniques to calculate a deformation using two or more cameras by comparing (1) images of a surface of an aircraft where shock waves are not present to (2) images of the surface of the aircraft where shock waves are present. For example, the shock wave manager apparatus may capture a first image (e.g., a reference image) with a first camera of the surface and a second image (e.g., a reference image) with a second camera, where the first and the second images are captured when shock waves are not present. The example shock wave manager apparatus may determine a first position of a dot of a pattern coupled to the surface based on the first and the second images. The example shock wave manager apparatus may capture a third image (e.g., an operational image) with the first camera of the surface and a fourth image (e.g., an operational image) with the second camera, where the third and the fourth images are captured when shock waves are present. The example shock wave manager apparatus may determine a second position of the dot based on the third and the fourth images. The example shock wave manager apparatus may compare the first and the second positions of the dot to determine a position difference. The example shock wave manager apparatus may map the position difference to a degree of deformation of the surface to calculate the deformation. The example shock wave manager apparatus may then use the calculated deformation to adjust a characterization of a shock wave measured by BOS techniques as described above.

The example shock wave manager apparatus may utilize photogrammetry techniques using two or more cameras to measure a distance between two points via triangulation (e.g., computer vision, reconstruction, etc.). For example, the shock wave manager apparatus may record a light ray in an image (e.g., a photographic image) corresponding to observing a direction from the camera to the points in 3-D coordinate space where the light ray was emitted or reflected. The example shock wave manager apparatus may use an image from two or more cameras to observe multiple directions to the points in 3-D coordinate space. The example shock wave manager apparatus may determine a relationship between the directions from the cameras relative to the other camera(s) or from the cameras relative to a 3-D object coordinate frame.

The example shock wave manager apparatus may reconstruct 3-D objects (e.g., a point on a pattern coupled to a surface of the aircraft) in a known digital coordinate system where measurements may be calculated. In some examples, the shock wave manager apparatus reconstructs 3-D objects using two or more cameras in stereo (e.g., to produce a stereo image, to generate a 3-D visual impression based on two or more 2-D images, etc.). The example shock wave manager apparatus may determine a point in 3-D coordinate space by obtaining the parameters of the camera projection function from 3-D to 2-D for the cameras involved. For example, the shock wave manager apparatus may obtain a camera matrix from the corresponding camera, a database, etc. In some instances, the camera matrix is a 3×4 matrix which describes a mapping of a camera (e.g., a pinhole camera) from 3-D points of an object in the real world to 2-D points of the object in an image captured by the camera.

Some disclosed example shock wave manager apparatus disclosed herein may control an actuator and/or a control surface of an aircraft based on determining a characteristic of a shock wave (e.g., a position of a shock wave, a strength of a shock wave, etc.) proximate a pattern coupled to a surface on a first side of the aircraft. For example, the shock wave manager apparatus may determine a position of a shock wave proximate a surface of an engine based on reference images captured during a baseline process (e.g., a calibration process). The example shock wave manager apparatus may determine a desired position of the shock wave based on a flight condition of the aircraft. The example shock wave manager apparatus may determine a difference between the position of the shock wave and the desired position of the shock wave. The example shock wave manager apparatus may generate and/or transmit a command to the actuator and/or the control surface based on the difference. The command may cause an action to occur such as, for example, an engine to adjust a thrust command, an elevator to adjust position, etc.

Some disclosed example shock wave manager apparatus disclosed herein may control an actuator and/or a control surface of an aircraft based on comparing a shock wave on a first side of an aircraft to a shock wave on a second side of an aircraft. For example, the shock wave manager apparatus may characterize a first shock wave (e.g., a position of a first shock wave, a strength of a first shock wave, etc.) proximate a pattern coupled to a left-side surface (e.g., a left-side wing) on a left-side of the aircraft. The example shock wave manager apparatus may characterize a second shock wave (e.g., a position of a second shock wave, a strength of a second shock wave, etc.) proximate a pattern coupled to a right-side surface (e.g., a right-side wing) on a right-side of the aircraft. The example shock wave manager apparatus may compare the first and the second shock waves to calculate a difference. The example shock wave manager apparatus may generate and/or transmit a command to the actuator and/or the control surface based on the difference. The command may cause an action to occur such as, for example, an engine to adjust a thrust command, an elevator to adjust position, etc.

Additionally or alternatively, the example shock wave manager apparatus may determine a difference between the first and the second shock waves to reference shock waves based on a flight condition of the aircraft. For example, the shock wave manager apparatus may compare the characterization of the first shock wave when the aircraft is traveling at 500 knots to a characterization of a first reference shock wave calculated during a baseline process. The first reference shock wave may be calculated based on data obtained during the baseline process corresponding to the aircraft traveling at 500 knots. In another example, the shock wave manager apparatus may compare the characterization of the second shock wave to a characterization of a second reference shock wave calculated during a baseline (e.g., a calibration) process. The example shock wave manager apparatus may generate and/or transmit a command to the actuator and/or the control surface based on the difference. The command may cause an action to occur such as, for example, an engine to adjust a thrust command, an elevator to adjust position, etc.

FIG. 1 is a schematic illustration of an example shock wave manager 100 coupled to an example aircraft 102 monitoring a shock wave 104 proximate a right-side wing 106 of the aircraft 102. Although the example shock wave manager 100 of FIG. 1 is forward the right-side wing 106, one or more components of the shock wave manager 100 may be located elsewhere on the aircraft 102. Although only the shock wave 104 is shown, there may be additional shock waves monitored by the example shock wave manager 100. For example, a shock wave may be present proximate a left-side wing 108 of the aircraft 102. The aircraft 102 includes slats 110, 112, ailerons 114, 116, flaps 118, 120, a vertical stabilizer 122, horizontal stabilizers 124, 126, and elevators 128, 130.

In the illustrated example of FIG. 1, the wings 106, 108, the slats 110, 112, the ailerons 114, 116, and the flaps 118, 120 are covered in a pattern 132. The pattern 132 is a speckled pattern that includes an arrangement or matrix of small circular shapes (e.g., dots, spots, etc.). Additionally or alternatively, the speckled pattern may include an arrangement or matrix of patches of a singular color or a combination of colors. Although a speckled pattern is depicted, the pattern 132 may include any other arrangement of geometric shapes such as, for example, triangles, rectangles, crescents, etc. In some instances, the pattern 132 may include more than one type of geometric shape. For example, the pattern 132 may include a plurality of triangles and a plurality of rectangles. In some examples, the pattern 132 includes more than one color (e.g., black circles and green circles), more than one shade of a color (e.g., forest-green circles, lime-green circles), etc. Additionally or alternatively, the pattern 132 may be a randomly distributed arrangement of geometric shapes (e.g., randomly colored geometric shapes).

In the illustrated example of FIG. 1, the shock wave manager 100 includes cameras 134, 136, 138, 140. The right-side cameras 134, 136 are operative to capture images of a right-side of the aircraft 102. For example, the right-side cameras 134, 136 may capture images of the right-side wing 106 and control surfaces operatively coupled to the right-side wing 106 such as, for example, the slats 110, the aileron 114, the flap 118, etc. The left-side cameras 138, 140 are operative to capture images of a left-side of the aircraft 102. For example, the left-side cameras 138, 140 may capture images of the left-side wing 108 and control surfaces operatively coupled to the left-side wing 108 such as, for example, the slats 112, the aileron 116, the flap 120, etc. The cameras 134, 136, 138, 140 are communicatively coupled to the example shock wave manager 100. In the illustrated example, the example shock wave manager 100 is communicatively coupled to light sources 142, 144. The light sources 142, 144 may be a light source such as, for example, an incandescent light source, a light-emitting diode (LED) light source, a strobe light source, etc. The example shock wave manager 100 may turn on the light sources 142, 144 when the cameras 134, 136, 138, 140 capture an insufficiently lighted image (e.g., at nighttime). The example shock wave manager 100 may turn on one, both, or neither of the light sources 142, 144 at any given time. Although the cameras 134, 136, 138, 140 and the light sources 142, 144 are depicted in FIG. 1 as being communicatively coupled to the example shock wave manager 100 via a cable including one or more wires, such as, for example, a cable 146, the cameras 134, 136, 138, 140 and the light sources 142, 144 may be additionally or alternatively communicatively coupled to the shock wave manager 100 via a wireless connection (e.g., a Bluetooth® connection, a cellular connection, a Wi-Fi Direct® network, etc.). Although the cameras 134, 136, 138, 140 and the light sources 142, 144 are depicted as coupled to a fuselage 152 of the aircraft 102 forward the vertical stabilizer 122, one or more of the cameras 134, 136, 138, 140 and/or the light sources 142, 144 may be installed elsewhere on the aircraft 102.

In the illustrated example of FIG. 1, the shock wave manager 100 characterizes a shock wave proximate a surface of the aircraft 102 such as, for example, the wings 106, 108, the ailerons, 114, 116, the flaps 118, 120, etc. For example, the shock wave manager 100 may characterize the shock wave 104 proximate the pattern 132 coupled to the surface of the right-side wing 106. The example shock wave manager 100 may characterize the shock wave 104 by determining a position of the shock wave 104, a strength of the shock wave 104, etc. The example shock wave manager 100 may determine the position of the shock wave 104 by comparing one or more subdivisions of the pattern 132 during different time periods. For example, the shock wave manager 100 may capture a first image and a second image of the right-side wing 106 via the right-side cameras 134, 136 during a first time period such as, for example, during a baseline (e.g., a calibration) process. The first and second images of the right-side wing 106 may also include the one or more subdivisions of the pattern 132 coupled to the slats 110, the aileron 114, the flap 118, etc. The example shock wave manager 100 may capture a third image and a fourth image of the right-side wing 106 via the right-side cameras 134, 136 during a second time period such as, for example, when the aircraft 102 is in flight and/or flying at a speed greater than a critical Mach number of the aircraft 102. The third and fourth images of the right-side wing 106 may also include the one or more subdivisions of the pattern 132 coupled to the slats 110, the aileron 114, the flap 118, etc. The example shock wave manager 100 may compare the one or more subdivisions in the first and second images to the one or more subdivisions in the third and fourth images to determine a difference (e.g., a position difference).

In the illustrated example of FIG. 1, the shock wave manager 100 calculates a deformation of a surface of interest. For example, the shock wave manager 100 may calculate a deformation of the wing 106 based on optical fibers 150. The optical fibers 150 may be embedded in the wing 106. Additionally or alternatively, the optical fibers 150 may be installed on the exterior surface of the wing 106 (e.g., on the top surface, on the underside surface, etc.). Although only two optical fibers 150 are shown, one or more than two optical fibers 150 may be used. Although only the optical fibers 150 are shown, additionally or alternatively, one or more optical fibers may be installed elsewhere on the aircraft (e.g., on the exterior of the horizontal stabilizer, embedded in the horizontal stabilizer, etc.). The example shock wave manager 100 may utilize one or more FOSS techniques as described above to determine a degree of deformation. For example, the shock wave manager 100 may map an intensity of light in the optical fibers 150 to a strain of the wing 106. Alternatively, the shock wave manager 100 may obtain an expected degree of deformation from a database, utilize one or more photogrammetry techniques as described above to determine a degree of deformation, etc. The example shock wave manager 100 may adjust a characterization of the shock wave 104 (e.g., a position of the shock wave 104, a strength of the shock wave 104, etc.) based on the degree of deformation.

In the illustrated example of FIG. 1, the shock wave manager 100 processes the first image and the second image using BOS techniques. Additionally or alternatively, any other method of processing images such as, for example, interferometry methods (e.g., holography, speckle interferometry, etc.), time-of-flight methods (e.g., distance measurement by optical modulation methods, pulse modulation methods, etc.), triangulation methods (e.g., angle measuring systems, phase measurement, shadow methods, etc.), etc. may be used. The example shock wave manager 100 may employ BOS techniques to determine a position and/or a strength of the shock wave 104 by reconstructing a plurality of light rays in which, for each camera, each image point of the shock wave 104 and a corresponding perspective center of the right-side cameras 134, 136 defines a spatial direction of a light ray to a corresponding object point of the shock wave 104. The example shock wave manager 100 may determine a position of the object point of the shock wave 104 by determining an intersection of at least two corresponding spatially separated light rays. For example, the shock wave manager 100 may determine a position of a partition of the shock wave 104 proximate the pattern 132 coupled to the right-side wing 106 by identifying a first light ray in a direction of the partition captured by the right-side camera 134 and identifying a second light ray in the direction of the partition captured by the right-side camera 136, where the first light ray intersects the second light ray.

In some examples, the example shock wave manager 100 uses single imaging (e.g., processing an image captured by a single camera), stereo imaging (e.g., processing images captured by two cameras), or multiple imaging (e.g., processing images captured by more than two cameras) methods dependent upon a number of cameras used by the shock wave manager 100. In the illustrated example, the shock wave manager 100 employs stereo imaging. For example, a first image captured by the right-side camera 134 and a second image captured by the right-side camera 136 may be used to characterize the shock wave 104.

In the illustrated example of FIG. 1, the shock wave manager 100 uses online BOS techniques to generate real-time measurement results. The example shock wave manager 100 may calculate measurement results concurrently after one or more images are obtained. For example, the shock wave manager 100 may calculate measurement results within a control cycle (e.g., a control cycle of 100 milliseconds) of the shock wave manager 100 after the one or more images are obtained to generate real-time measurement results. Alternatively, the example shock wave manager 100 may use offline BOS techniques to characterize the shock wave 104. For example, the shock wave manager 100 may calculate measurement results within one or more control cycles of the shock wave manager 100 or when the aircraft 102 is not experiencing the shock wave 104.

In the illustrated example of FIG. 1, the shock wave manager 100 utilizes photogrammetry techniques and/or BOS techniques to generate a global coordinate system of the pattern 132. For example, the shock wave manager 100 may determine the coordinates (e.g., the 3-D coordinates) of one or more partitions (e.g., points) or subdivisions (e.g., a collection of two or more points) of the pattern 132 relative to the global coordinate system. The example shock wave manager 100 may calculate various dimensions and/or elements of the pattern 132 such as for example area definitions, distances, lines, surface definitions, etc. In some examples, the shock wave manager 100 determines a difference between a set of coordinates of a point of the pattern 132. For example, the shock wave manager 100 may determine a position difference of the point of the pattern 132 based on a coordinate difference between a first set of coordinates and a second set of coordinates. The first set of coordinates may correspond to a first position of the point of the pattern 132 captured in a first image obtained by the right-side camera 134. The second set of coordinates may correspond to a second position of the point of the pattern 132 captured in a second image obtained by the right-side camera 136. The example shock wave manager 100 may calculate a third set of coordinates based on the position difference, where the third set of coordinates corresponds to the position of the shock wave 104.

In some examples, the shock wave manager 100 determines a strength of the shock wave 104. For example, the shock wave manager 100 may capture a first image of the shock wave 104 proximate the pattern 132 coupled to the surface of the right-side wing 106. The example shock wave manager 100 may compare the first image of the shock wave 104 to a second image. The second image may be an image of the pattern 132 coupled to the surface of the right-side wing 106 when the aircraft 102 is flying at a speed at which the shock wave 104 is not present proximate the pattern 132 of the right-side wing 106 (e.g., the aircraft 102 is flying below a critical Mach number of the aircraft 102, the aircraft 102 is stationary on a ground surface, etc.). The example shock wave manager 100 may utilize a relationship regarding a refractive index of light through a medium to analyze the pattern 132 of the right-side wing 106. For example, the shock wave manager 100 may utilize one or more relationships derived from Snell's law as described below in Equation (1):

$$\frac{\sin(\theta_1)}{\sin(\theta_2)} = \frac{v_1}{v_2} = \frac{\lambda_1}{\lambda_2} = \frac{n_2}{n_1} \qquad \text{Equation (1)}$$

In the illustrated example of Equation (1), the variable $\theta_1$ represents a first angle measured from the normal of a boundary, where the boundary separates two mediums. A first example medium may be air of a first thickness (e.g., air surrounding the aircraft 102, air surrounding the shock wave 104, etc.). A second example medium may be air of a second thickness (e.g., air within the shock wave 104), the second thickness different than the first thickness. The variable $\theta_2$ represents a second angle measured from the normal of the boundary. For example, the variable $\theta_1$ may represent an angle of incidence of a light ray from a light source (e.g., the light source 142, the light source 144, the sun, etc.) relative to the normal of the boundary between the first medium and the second medium. The variable $\theta_2$ may represent an angle of refraction of the light ray from the light source as the light ray passes through the second medium.

In the illustrated example of Equation (1), the variable $v_1$ represents a first phase velocity corresponding to the first angle $\theta_1$ and the variable $v_2$ represents a second phase velocity corresponding to the second angle $\theta_2$. The variable $\lambda_1$ represents a first wavelength corresponding to the light ray traveling through the first medium and the variable $\lambda_2$ represents a second wavelength corresponding to the light ray traveling through the second medium. The variable $n_1$ represents a first refractive index corresponding to the first medium (e.g., the incidence medium) and the variable $n_2$ represents a second refractive index corresponding to the second medium (e.g., the refractive medium).

In the illustrated example of Equation (1), the example shock wave manager 100 may determine a density of the shock wave 104 based on calculating a refractive index corresponding to a light ray traveling through the shock wave 104. For example, the shock wave manager 100 may use one or more of the relationships described above in Equation (1) to calculate the second refractive index $n_2$. The second refractive index $n_2$ may correspond to the light ray traveling through the second medium, where the second medium may be the air within the shock wave 104, where the air is different than the first medium (e.g., the air surrounding the aircraft 102, the air surrounding the shock wave 104, etc.). The refractive indices $n_1$ and $n_2$ are related to a density of the mediums by the Gladstone-Dale equation as described below in Equation (2):

$$n=G\rho+1 \qquad \text{Equation (2)}$$

In the illustrated example of Equation (2) above, the variable n represents a refractive index of a medium, the variable G represents a Gladstone-Dale constant based on the medium, and the variable $\rho$ represents a density of the medium. The Gladstone-Dale constant depends on one or more characteristics of a gas in a medium of interest and on a frequency of light used to perform the BOS techniques, etc. The example shock wave manager 100 may utilize Equation (2) to calculate the density of the second medium based on the refractive index of the second medium. The example shock wave manager 100 may determine a strength of the shock wave 104 based on the density (e.g., the density field) of the shock wave 104.

In some examples, the shock wave manager 100 controls an actuator (e.g., an engine) and/or a control surface of the aircraft 102 based on the characterization of the shock wave 104. For example, the shock wave manager 100 may control the slats 110, 112, the ailerons 114, 116, the flaps 118, 120, etc. based on the position and/or the strength of the shock wave 104. The example shock wave manager 100 may obtain a flight condition of the aircraft 102 (e.g., an altitude, an air speed, a total air temperature, etc.) via a sensor 148. The example shock wave manager 100 may obtain a first status of one or more actuators (e.g., an engine speed) and/or a first position of one or more control surfaces of the aircraft 102. For example, the shock wave manager 100 may obtain a first position of the slats 110, 112 the ailerons 114, 116, the flaps 118, 120, etc.

The example shock wave manager 100 may determine a first characterization of the shock wave 104. For example, the shock wave manager 100 may calculate a first position and/or a first strength of the shock wave 104. The first position and/or the first strength of the shock wave 104 may be a desired or an expected position and/or an expected strength of the shock wave 104. The example shock wave manager 100 may determine a second characterization of the shock wave 104. For example, the shock wave manager 100 may calculate a second position and/or a second strength of the shock wave 104. The second position and/or the second strength of the shock wave 104 may be an actual (e.g., a current, an instant, etc.) position and/or an actual strength of the shock wave 104. The example shock wave manager 100 may calculate a characterization difference between the first characterization and the second characterization of the shock wave 104. For example, the shock wave manager 100 may calculate a difference between the first position and the second position of the shock wave 104.

The example shock wave manager 100 may calculate a second status of the one or more actuators (e.g., a status of a parameter of the one or more actuators) and/or a second position of the one or more control surfaces of the aircraft 102 based on the characterization difference. For example, the shock wave manager 100 may calculate a second position of the slats 110, 112, the ailerons 114, 116, the flaps 118, 120, etc., the second position different than the first position. The example shock wave manager 100 may generate and/or transmit a command to the one or more actuators and/or the one or more control surfaces based on the characterization difference. For example, the shock wave manager 100 may move the slats 110, 112, the ailerons 114, 116, the flaps 118, 120, etc. from the first position to the second position.

Figure 2A:
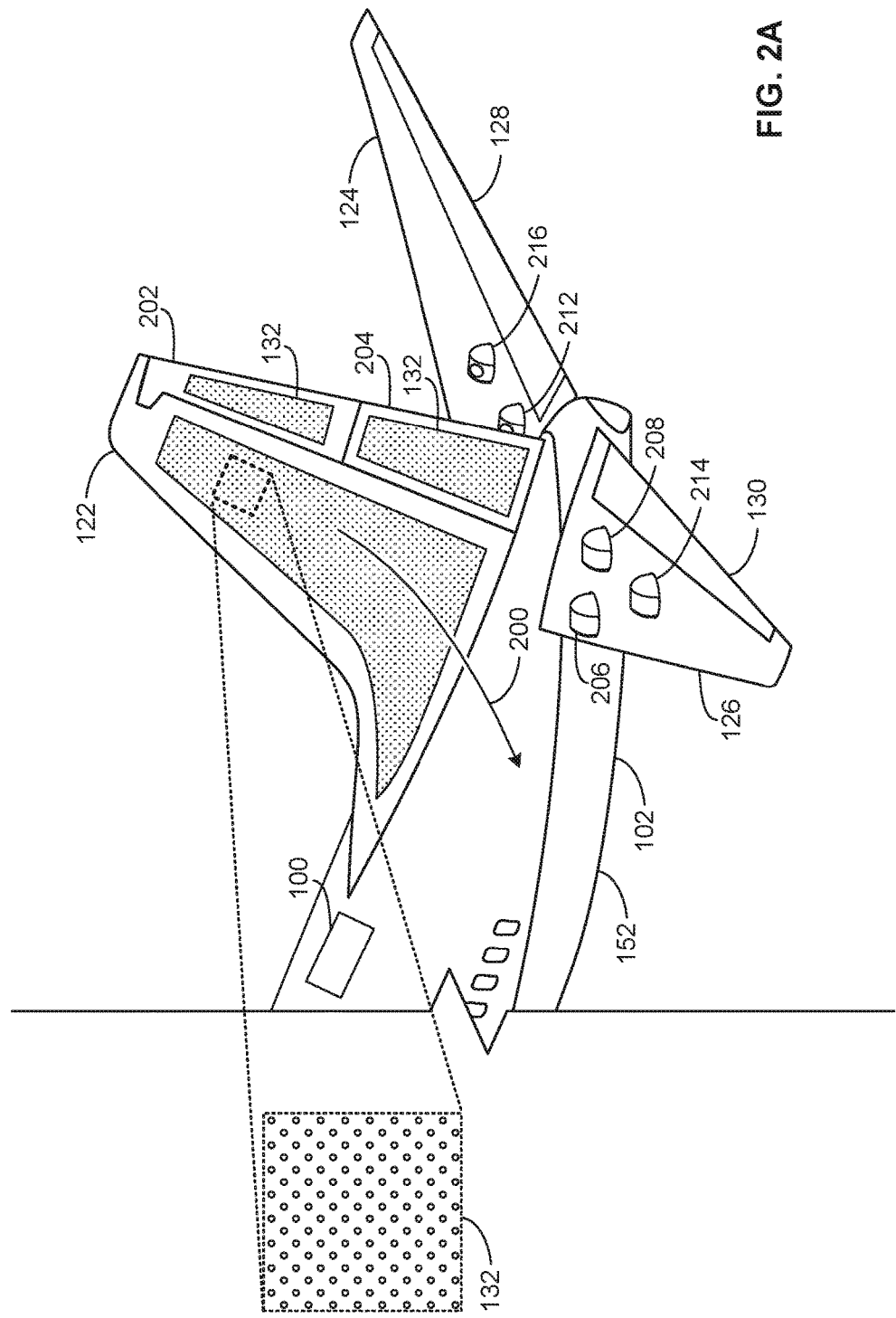
FIGS. 2A and 2B are schematic illustrations of the example shock wave manager apparatus coupled to the example aircraft monitoring a shock wave proximate a vertical stabilizer of the aircraft.

FIG. 2A is a schematic illustration of the example shock wave manager 100 coupled to the example aircraft 102 of FIG. 1 monitoring a shock wave 200 proximate a surface of the vertical stabilizer 122 of the aircraft 102. Although the example shock wave manager 100 of FIG. 2A is forward the vertical stabilizer 122 and aft the wings 106, 108, one or more components of the shock wave manager 100 may be located elsewhere on the aircraft 102. Although only the shock wave 200 is shown, there may be additional shock waves monitored by the example shock wave manager 100. The vertical stabilizer 122 includes rudders 202, 204. The pattern 132 is coupled to a surface of the vertical stabilizer 122 and the rudders 202, 204. Although the pattern 132 is depicted in FIG. 2A to be coupled to a left side of the vertical stabilizer 122 and a left side of the rudders 202, 204, the pattern may be additionally or alternatively coupled to a right side of the vertical stabilizer 122 and a right side of the rudders 202, 204.

In the illustrated example of FIG. 2A, the shock wave manager 100 includes cameras 206, 208, 210 (FIG. 2B), 212. Left-side cameras 206, 208 are operative to capture images of the left side of the vertical stabilizer 122 and the left side of the control surfaces operatively coupled to the vertical stabilizer 122 such as, for example, the rudders 202, 204. Right-side cameras 210 (FIG. 2B), 212 are operative to capture images of the right-side of the vertical stabilizer 122 and the right side of the control surfaces operatively coupled to the vertical stabilizer 122 such as, for example, the rudders 202, 204. The cameras 206, 208, 210 (FIG. 2B), 212 are communicatively coupled to the example shock wave manager 100. In the illustrated example, the example shock wave manager 100 is communicatively coupled to light sources 214, 216. Each of the light sources 214, 216 may be a light source such as, for example, an incandescent light source, a light-emitting diode (LED) light source, a strobe light source, etc. The example shock wave manager 100 may turn on the light sources 214, 216 when the cameras 206, 208, 210 (FIG. 2B), 212 capture an insufficiently lighted image (e.g., at nighttime). The example shock wave manager 100 may turn on one, both, or neither of the light sources 214, 216 at any given time. Although the cameras 206, 208, 210 (FIG. 2B), 212 and the light sources 214, 216 are depicted as coupled to the horizontal stabilizers 124, 126 of the aircraft 102, one or more of the cameras 206, 208, 210 (FIG. 2B), 212 and/or the light sources 214, 216 may be installed elsewhere on the aircraft 102.

In the illustrated example of FIG. 2A, the shock wave manager 100 characterizes a shock wave proximate a surface of the aircraft 102 such as, for example, the vertical stabilizer 122, the rudders 202, 204, etc. For example, the shock wave manager 100 may characterize the shock wave 200 proximate the pattern 132 coupled to the surface of the left side of the vertical stabilizer 122. The example shock wave manager 100 may characterize the shock wave 200 by determining a position of the shock wave 200, a strength of the shock wave 200, etc. as described above in connection with FIG. 1. Additionally or alternatively, the example shock wave manager 100 may characterize a right-side (e.g., a right-side of the aircraft 102) shock wave proximate the pattern 132 coupled to the surface of the right side of the vertical stabilizer 122, the right side of the rudders 202, 204, etc. The example shock wave manager 100 may characterize the right-side shock wave as described above in connection with FIG. 1.

In some examples, the shock wave manager 100 controls an actuator (e.g., an engine) and/or a control surface of the aircraft 102 based on the characterization of the shock wave 200 and/or the right-side shock wave as described above in connection with FIG. 1. For example, the shock wave manager 100 may control the vertical stabilizer 122, the rudders 202, 204, etc. based on the position and/or the strength of the shock wave 200, the right-side shock wave, etc. The example shock wave manager 100 may generate and/or transmit a command to the one or more actuators and/or the one or more control surfaces based on a characterization difference. In some examples, the characterization difference is a strength difference between an actual (e.g., a current) strength of a shock wave and a reference strength of a shock wave. For example, the strength difference may be a difference between (1) a strength of the shock wave 200 and (2) a reference strength of a shock wave based on a flight condition of the aircraft 102. In some instances, the characterization difference is a strength difference between an actual (e.g., a current) strength of a first shock wave on the left side of the aircraft and an actual strength of a second shock wave on the right side of the aircraft. For example, the strength difference may be a difference between (1) a strength of the shock wave 200 proximate the pattern 132 coupled to the surface of the left side of the vertical stabilizer 122 and (2) a strength of a shock wave proximate the pattern 132 coupled to the surface of the right side of the vertical stabilizer 122. The example shock wave manager 100 may move the vertical stabilizer 122, the rudders 202, 204, etc. from a first position to a second position based on the characterization difference (e.g., the position difference, the strength difference, etc.).

Figure 2B:
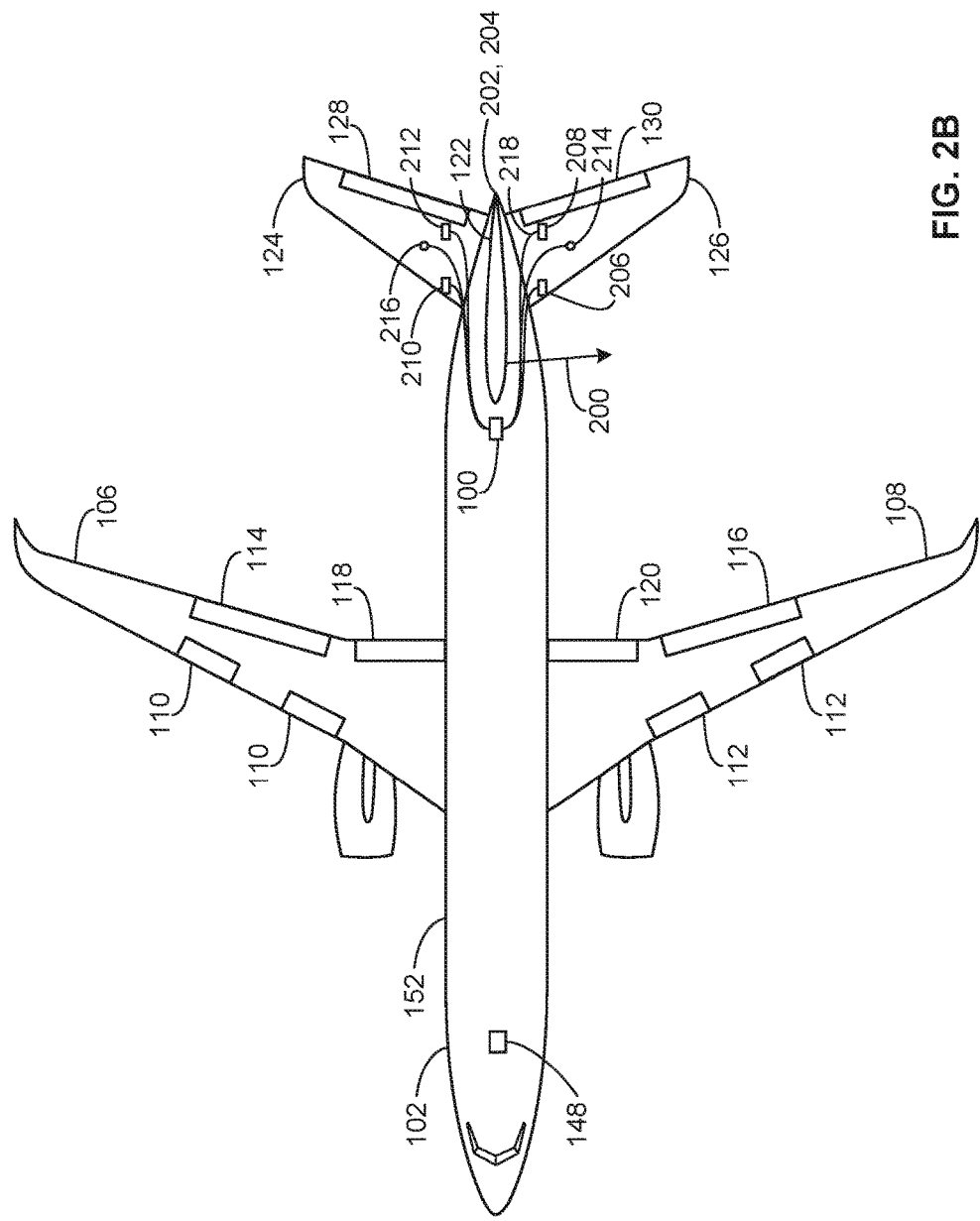

FIG. 2B is a schematic illustration of a plan view of the aircraft 102 of FIGS. 1 and 2A. In the illustrated example of FIG. 2B, the shock wave manager 100 includes the cameras 206, 208, 210, 212 to monitor the shock wave 200 proximate a surface of the vertical stabilizer 122. Although the example shock wave manager 100 of FIG. 2B is forward the vertical stabilizer 122 and aft the wings 106, 108, one or more components of the shock wave manager 100 may be located elsewhere on the aircraft 102. In the illustrated example of FIG. 2B, the shock wave manager 100 includes the cameras 206, 208, 210, 212. The left-side cameras 206, 208 are operative to capture images of the left side of the vertical stabilizer 122 and the left side of the control surfaces operatively coupled to the vertical stabilizer 122 such as, for example, the rudders 202, 204. Right-side cameras 210, 212 are operative to capture images of the right side of the vertical stabilizer 122 and the right side of the control surfaces operatively coupled to the vertical stabilizer 122 such as, for example, the rudders 202, 204.

In the illustrated example of FIG. 2B, the cameras 206, 208, 210, 212 are communicatively coupled to the example shock wave manager 100. In the illustrated example, the example shock wave manager 100 is communicatively coupled to the light sources 214, 216. Although the cameras 206, 208, 210, 212 and the light sources 214, 216 are depicted in FIG. 2B as being communicatively coupled to the example shock wave manager 100 via a cable including one or more wires such as, for example, a cable 218, the cameras 206, 208, 210, 212 and the light sources 214, 216 may be additionally or alternatively communicatively coupled to the shock wave manager 100 via a wireless connection (e.g., a Bluetooth® connection, a cellular connection, a Wi-Fi Direct® network, etc.).

Figure 3:
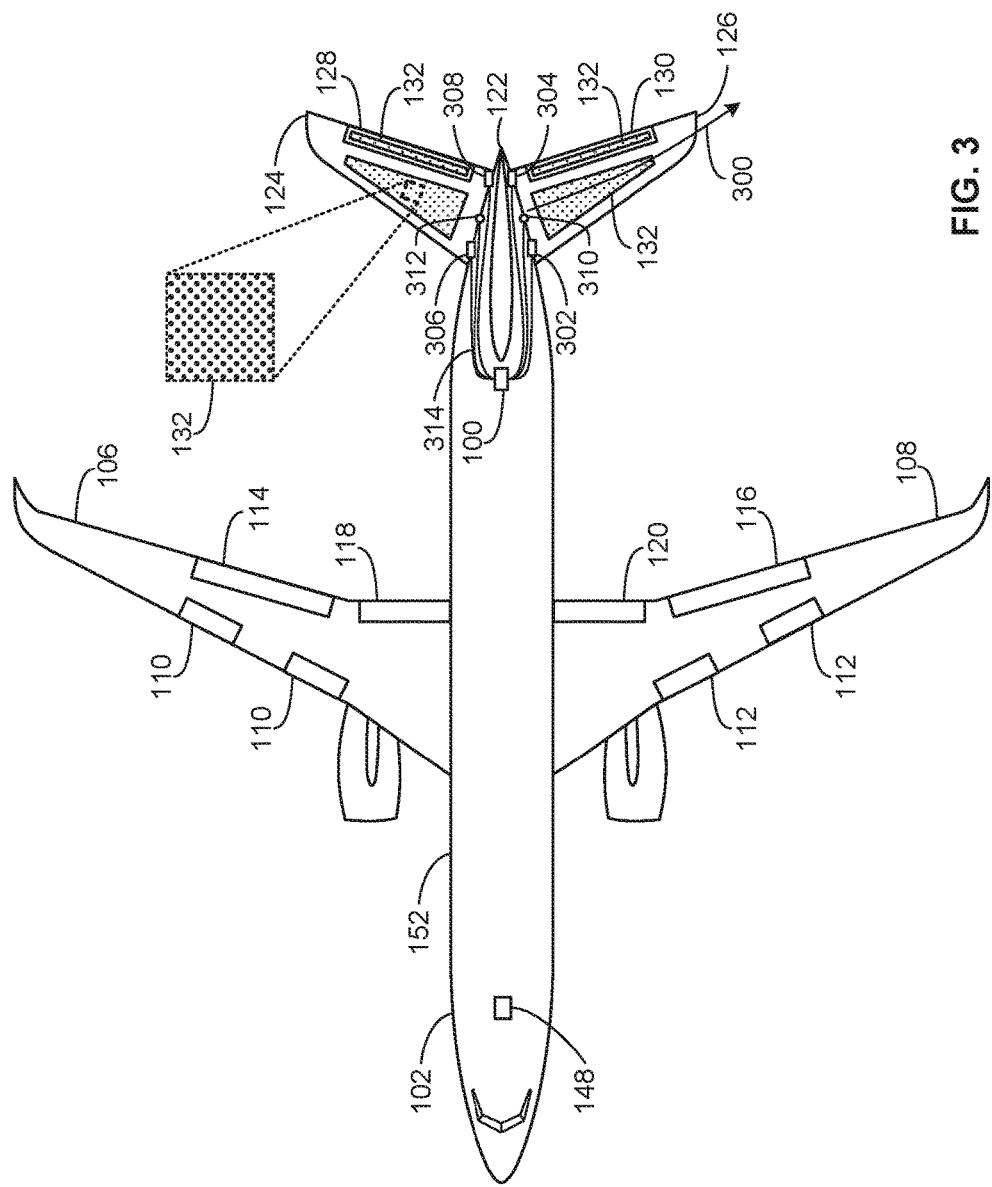
FIG. 3 is a schematic illustration of the example shock wave manager apparatus coupled to the example aircraft monitoring a shock wave proximate a horizontal stabilizer of the aircraft.

FIG. 3 is a schematic illustration of the example shock wave manager 100 coupled to the example aircraft 102 of FIG. 1 monitoring a shock wave 300 proximate a surface of the horizontal stabilizer 126 of the aircraft 102. Although the example shock wave manager 100 of FIG. 3 is forward the vertical stabilizer 122 and aft the wings 106, 108, one or more components of the shock wave manager 100 may be located elsewhere on the aircraft 102. Although only the shock wave 300 is shown, there may be additional shock waves monitored by the example shock wave manager 100. The horizontal stabilizer 126 includes the elevator 130. The pattern 132 is coupled to a surface of the horizontal stabilizer 126 and a surface of the elevator 130. In the illustrated example, the pattern 132 is also coupled to a surface of the horizontal stabilizer 124 and a surface of the elevator 128.

In the illustrated example of FIG. 3, the shock wave manager 100 includes cameras 302, 304, 306, 308. Left-side cameras 302, 304 are operative to capture images of the horizontal stabilizer 126 and the control surfaces operatively coupled to the horizontal stabilizer 126 such as, for example, the elevator 130. Right-side cameras 306, 308 are operative to capture images of the horizontal stabilizer 124 and the control surfaces operatively coupled to the horizontal stabilizer 124 such as for example the elevator 128. The cameras 302, 304, 306, 308 are communicatively coupled to the example shock wave manager 100. In the illustrated example, the example shock wave manager 100 is communicatively coupled to light sources 310, 312. Each of the light sources 310, 312 may be a light source such as, for example, an incandescent light source, a light-emitting diode (LED) light source, a strobe light source, etc. The example shock wave manager 100 may turn on the light sources 310, 312 when the cameras 302, 304, 306, 308 capture an insufficiently lighted image (e.g., at nighttime). The example shock wave manager 100 may turn on one, both, or neither of the light sources 310, 312 at any given time. Although the cameras 302, 304, 306, 308 and the light sources 310, 312 are depicted in FIG. 3 as being communicatively coupled to the example shock wave manager 100 via a cable including one or more wires such as, for example, a cable 314, the cameras 302, 304, 306, 308 and the light sources 310, 312 may be additionally or alternatively communicatively coupled to the shock wave manager 100 via a wireless connection (e.g., a Bluetooth® connection, a cellular connection, a Wi-Fi Direct® network, etc.). Although the cameras 302, 304, 306, 308 and the light sources 310, 312 are depicted as coupled to the fuselage 152 of the aircraft 102 aft the wings 106, 108, one or more of the cameras 302, 304, 306, 308 and/or the light sources 310, 312 may be installed elsewhere on the aircraft 102.

In the illustrated example of FIG. 3, the shock wave manager 100 characterizes a shock wave proximate a surface of the aircraft 102 such as, for example, the horizontal stabilizer 126, the elevator 130, etc. For example, the shock wave manager 100 may characterize the shock wave 300 proximate the pattern 132 coupled to the surface of the horizontal stabilizer 126. The example shock wave manager 100 may characterize the shock wave 300 by determining a position of the shock wave 300, a strength of the shock wave 300, etc. as described above in connection with FIG. 1. Additionally or alternatively, the example shock wave manager 100 may characterize a right-side (e.g., a right-side of the aircraft 102) shock wave proximate the pattern 132 coupled to the surface of the horizontal stabilizer 124, the elevator 128, etc. The example shock wave manager 100 may characterize the right-side shock wave as described above in connection with FIG. 1.

In some examples, the shock wave manager 100 controls an actuator (e.g., an engine) and/or a control surface of the aircraft 102 based on the characterization of the shock wave 300 and/or the right-side shock wave as described above in connection with FIG. 1. For example, the shock wave manager 100 may control the horizontal stabilizers 124, 126, the elevators 128, 130, etc. based on the position and/or the strength of the shock wave 300, the right-side shock wave, etc. The example shock wave manager 100 may generate and/or transmit a command to the one or more actuators and/or the one or more control surfaces based on a characterization difference. In some examples, the characterization difference is a strength difference between an actual (e.g., a current) strength of a shock wave and a reference strength of a shock wave. For example, the strength difference may be a difference between (1) a strength of the shock wave 300 and (2) a reference strength of a shock wave based on a flight condition of the aircraft 102. In some instances, the characterization difference is a strength difference between an actual (e.g., a current) strength of a first shock wave on the left side of the aircraft and an actual strength of a second shock wave on the right side of the aircraft. For example, the strength difference may be a difference between (1) a strength of the shock wave 300 proximate the pattern 132 coupled to the surface of the horizontal stabilizer 126 and (2) a strength of a shock wave proximate the pattern 132 coupled to the surface of the horizontal stabilizer 124. The example shock wave manager 100 may move the horizontal stabilizers 124,126, the elevators 128, 130, etc. from a first position to a second position based on the characterization difference (e.g., the position difference, the strength difference, etc.).

Figure 4:
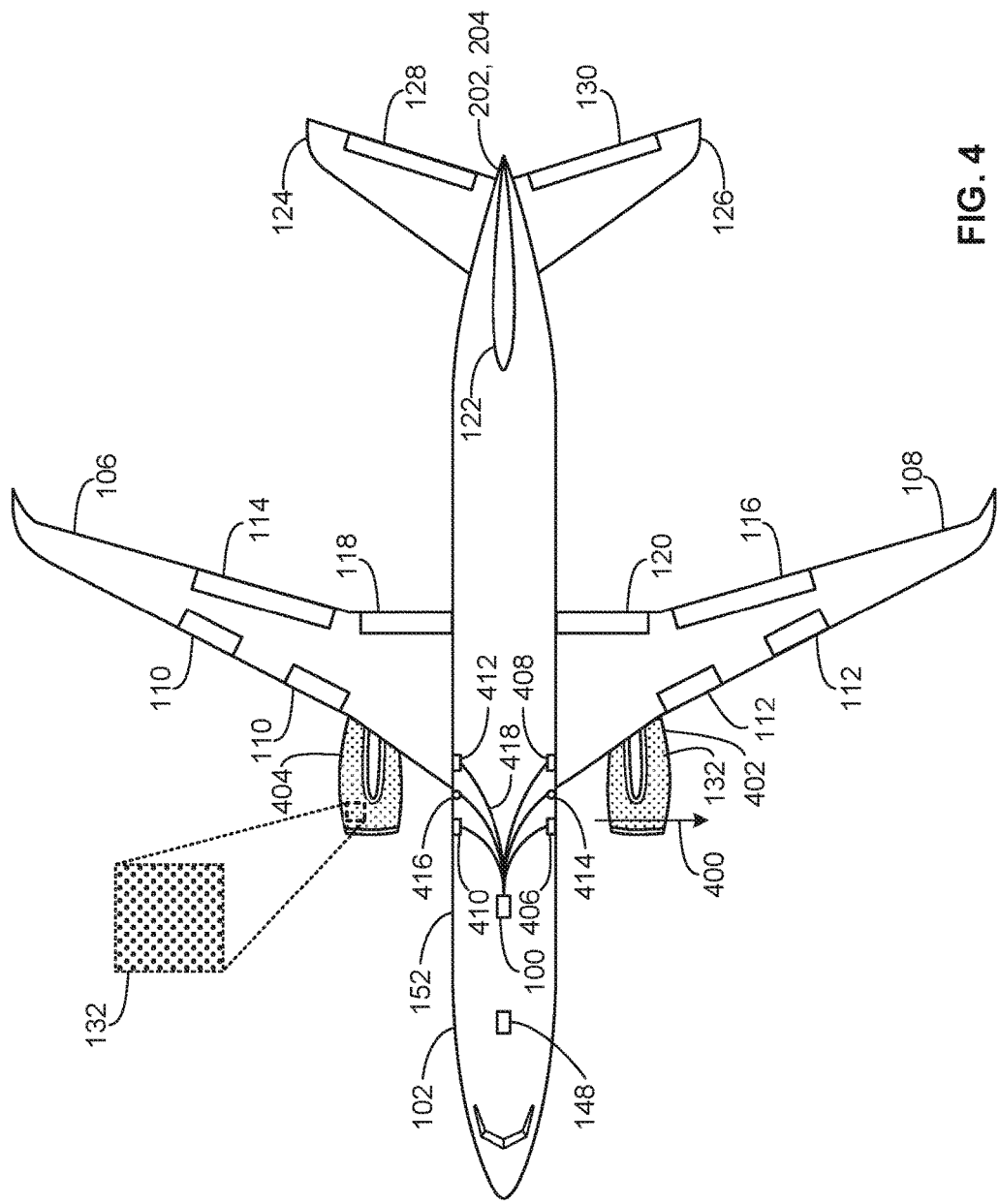
FIG. 4 is a schematic illustration of the example shock wave manager apparatus coupled to the example aircraft monitoring a shock wave proximate an engine of the aircraft.

FIG. 4 is a schematic illustration of the example shock wave manager 100 coupled to the example aircraft 102 of FIG. 1 monitoring a shock wave 400 proximate a surface of a left-side engine 402 of the aircraft 102. Although the example shock wave manager 100 of FIG. 4 is forward the wings 106, 108, one or more components of the shock wave manager 100 may be located elsewhere on the aircraft 102. Although only the shock wave 400 is shown, there may be additional shock waves monitored by the example shock wave manager 100. The pattern 132 is coupled to a surface of the left-side engine 402. In the illustrated example, the pattern 132 is also coupled to a surface of another engine 404 coupled to the aircraft 102.

In the illustrated example of FIG. 4, the shock wave manager 100 includes cameras 406, 408, 410, 412. Left-side cameras 406, 408 are operative to capture images of the surface of the left-side engine 402. Right-side cameras 410, 412 are operative to capture images of the surface of the right-side engine 404. The cameras 406, 408, 410, 412 are communicatively coupled to the example shock wave manager 100. In the illustrated example, the example shock wave manager 100 is communicatively coupled to light sources 414, 416. Each of the light sources 414, 416 may be a light source such as, for example, an incandescent light source, a light-emitting diode (LED) light source, a strobe light source, etc. The example shock wave manager 100 may turn on the light sources 414, 416 when the cameras 406, 408, 410, 412 capture an insufficiently lighted image (e.g., at nighttime). The example shock wave manager 100 may turn on one, both, or neither of the light sources 414, 416 at any given time. Although the cameras 406, 408, 410, 412 and the light sources 414, 416 are depicted in FIG. 4 as being communicatively coupled to the example shock wave manager 100 via a cable including one or more wires such as, for example, a cable 418, the cameras 406, 408, 410, 412 and the light sources 414, 416 may be additionally or alternatively communicatively coupled to the shock wave manager 100 via a wireless connection (e.g., a Bluetooth® connection, a cellular connection, a Wi-Fi Direct® network, etc.). Although the cameras 406, 408, 410, 412 and the light sources 414, 416 are depicted as coupled to the fuselage 152 of the aircraft 102 forward the vertical stabilizer 122, one or more of the cameras 406, 408, 410, 412 and/or the light sources 414, 416 may be installed elsewhere on the aircraft 102.

In the illustrated example of FIG. 4, the shock wave manager 100 characterizes a shock wave proximate a surface of the aircraft 102 such as, for example, the surfaces of the engines 402, 404. For example, the shock wave manager 100 may characterize the shock wave 400 proximate the pattern 132 coupled to the surface of the left-side engine 402. The example shock wave manager 100 may characterize the shock wave 400 by determining a position of the shock wave 400, a strength of the shock wave 400, etc. as described above in connection with FIG. 1. Additionally or alternatively, the example shock wave manager 100 may characterize a right-side (e.g., a right-side of the aircraft 102) shock wave proximate the pattern 132 coupled to the surface of the engine 404, etc. The example shock wave manager 100 may characterize the right-side shock wave as described above in connection with FIG. 1.

In some examples, the shock wave manager 100 controls an actuator (e.g., an engine) and/or a control surface of the aircraft 102 based on the characterization of the shock wave 400 and/or the right-side shock wave as described above in connection with FIG. 1. For example, the shock wave manager 100 may control the engines 402, 404 based on the position and/or the strength of the shock wave 400. Additionally or alternatively, the example shock wave manager 100 may control the slats 110, 112, the ailerons 114, 116, the flaps 118, 120, the vertical stabilizer 122, the elevators 128, 130, the horizontal stabilizers 124, 126, and/or the rudders 202, 204 of FIGS. 2A and/or 2B based on the position and/or the strength of the shock wave 400, the right-side shock wave, etc.

The example shock wave manager 100 may generate and/or transmit a command to the one or more actuators and/or the one or more control surfaces based on a characterization difference. In some examples, the characterization difference is a strength difference between an actual (e.g., a current) strength of a shock wave and a reference strength of a shock wave. For example, the strength difference may be a difference between (1) a strength of the shock wave 400 and (2) a reference strength of a shock wave based on a flight condition of the aircraft 102. In some instances, the characterization difference is a strength difference between an actual (e.g., a current) strength of a first shock wave on the left side of the aircraft and an actual strength of a second shock wave on the right side of the aircraft. For example, the strength difference may be a difference between (1) a strength of the shock wave 400 proximate the pattern 132 coupled to the surface of the engine 402 and (2) a strength of a shock wave proximate the pattern 132 coupled to the surface of the engine 404. The example shock wave manager 100 may adjust the engine speed of the engines 402, 404 from a first engine speed to a second engine speed based on the characterization difference (e.g., the position difference, the strength difference, etc.).

Figure 5:
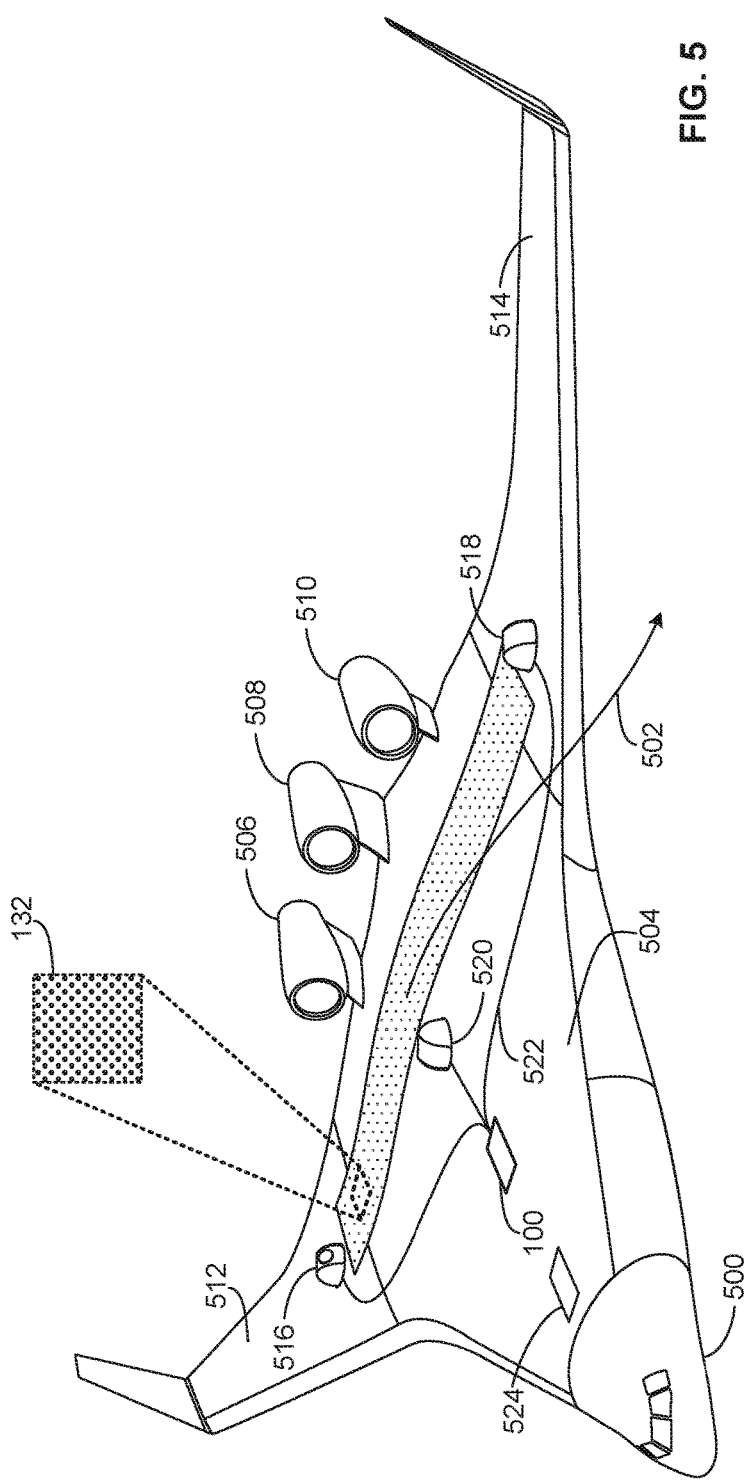
FIG. 5 is a schematic illustration of the example shock wave manager apparatus coupled to yet another example aircraft monitoring a shock wave proximate an engine of the aircraft.

FIG. 5 is a schematic illustration of the example shock wave manager 100 coupled to an example aircraft 500 monitoring a shock wave 502 proximate a surface of a fuselage 504 forward engines 506, 508, 510 of the aircraft 500. Although only the shock wave 502 is shown, there may be additional shock waves monitored by the example shock wave manager 100. The pattern 132 is coupled to the surface of the fuselage 504 forward the engines 506, 508, 510. The aircraft 500 is a blended wing body (BWB) aircraft where the engines 506, 508, 510 are coupled at the rear of the aircraft 500 above the fuselage 504, where the fuselage 504 is blended with wing structures 512, 514 for desired aerodynamic properties. Although the example shock wave manager 100 is depicted in FIG. 5 to be forward the wing structures 512, 514, one or more components of the shock wave manager 100 may be located elsewhere on the aircraft 500.

In the illustrated example of FIG. 5, the shock wave manager 100 includes cameras 516, 518. The cameras 516, 518 are operative to capture images of the surface forward the engines 506, 508, 510. The cameras 516, 518 are communicatively coupled to the example shock wave manager 100. In the illustrated example, the example shock wave manager 100 is communicatively coupled to a light source 520. The light source 520 may be a light source such as, for example, an incandescent light source, a light-emitting diode (LED) light source, a strobe light source, etc. The example shock wave manager 100 may turn on the light source 520 when the cameras 516, 518 capture an insufficiently lighted image (e.g., at nighttime). The example shock wave manager 100 may turn on the light source 520 at any given time. Although the cameras 516, 518 and the light source 520 are depicted in FIG. 5 as being communicatively coupled to the example shock wave manager 100 via a cable including one or more wires such as, for example, a cable 522, the cameras 516, 518 and the light source 520 may be additionally or alternatively communicatively coupled to the shock wave manager 100 via a wireless connection (e.g., a Bluetooth® connection, a cellular connection, a Wi-Fi Direct® network, etc.). Although the cameras 516, 518 and the light source 520 are coupled to the fuselage 504 of the aircraft 500 forward the engines 506, 508, 510, each of the cameras 516, 518 and/or the light source 520 may be installed elsewhere on the aircraft 500.

In the illustrated example of FIG. 5, the shock wave manager 100 characterizes a shock wave proximate the pattern 132 coupled to a surface of the aircraft 500. For example, the shock wave manager 100 may characterize the shock wave 502 proximate the pattern 132 coupled to the surface forward the engines 506, 508, 510. The example shock wave manager 100 may characterize the shock wave 502 by determining a position of the shock wave 502, a strength of the shock wave 502, etc. as described above in connection with FIG. 1.

In some examples, the shock wave manager 100 controls an actuator (e.g., an engine) and/or a control surface of the aircraft 500 based on the characterization of the shock wave 502 as described above in connection with FIG. 1. For example, the shock wave manager 100 may control one or more of the engines 506, 508, 510 based on the position and/or the strength of the shock wave 502. Additionally or alternatively, the example shock wave manager 100 may control additional control surfaces of the aircraft 500 based on the position and/or the strength of the shock wave 502.

The example shock wave manager 100 may generate and/or transmit a command to the one or more actuators and/or the one or more control surfaces based on a characterization difference. In some examples, the characterization difference is a position difference between an actual (e.g., a current) position of a shock wave and a reference position of a shock wave. For example, the position difference may be a difference between (1) a position of the shock wave 502 and (2) a reference position of a shock wave based on a flight condition of the aircraft 102. In some instances, the characterization difference is a strength difference between an actual (e.g., a current) strength of a shock wave and a reference strength of a shock wave. For example, the strength difference may be a difference between (1) a strength of the shock wave 502 and (2) a reference strength of a shock wave based on a flight condition of the aircraft 102. The example shock wave manager 100 may adjust the engine speed of one or more of the engines 506, 508, 510 from a first engine speed to a second engine speed based on the characterization difference (e.g., the position difference, the strength difference, etc.).

Figure 6:
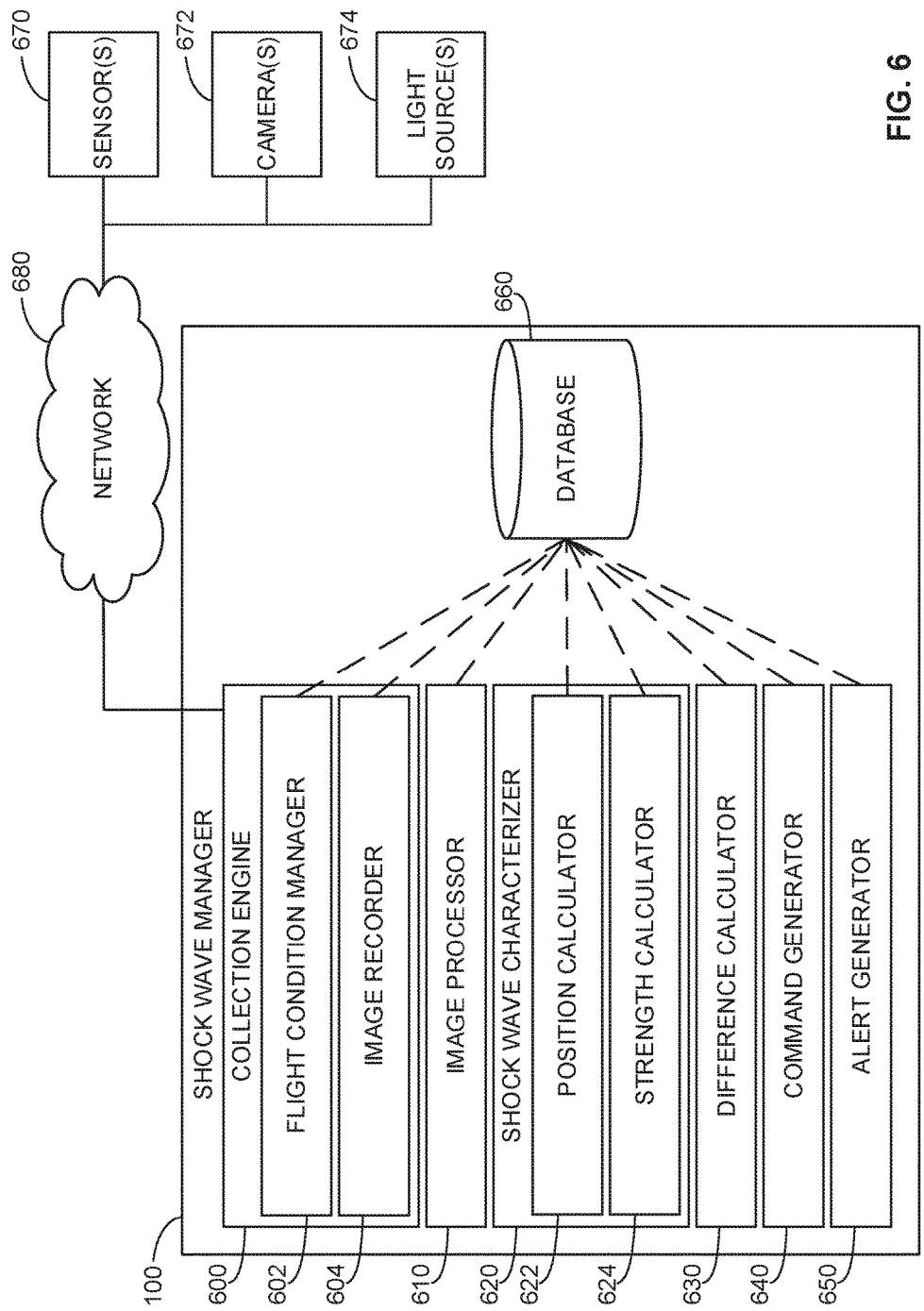
FIG. 6 is a block diagram of an example implementation of the example shock wave manager apparatus of FIGS. 1-5.

FIG. 6 is a block diagram of an example implementation of the shock wave manager 100 of FIGS. 1-5. The example shock wave manager 100 characterizes a shock wave proximate a surface of an aircraft. For example, the shock wave manager 100 may calculate a position and/or a strength of a shock wave proximate a surface of an actuator and/or a control surface of an aircraft. The example shock wave manager 100 includes an example collection engine 600, an example flight condition manager 602, an example image recorder 604, an example image processor 610, an example shock wave characterizer 620, an example position calculator 622, an example strength calculator 624, an example difference calculator 630, an example command generator 640, an example alert generator 650, and an example database 660. The example shock wave manager 100 is communicatively coupled to sensor(s) 670, camera(s) 672, and light source(s) 674 via a network 680. The sensor(s) 670 is an example implementation of the sensors 148, 524. The camera(s) 672 is an example implementation of the cameras 134, 136, 138, 140, 206, 208, 210, 212, 302, 304, 306, 308, 406, 408, 410, 412, 516, 518 as illustrated in FIGS. 1-5. The light source(s) 674 is an example implementation of the light sources 142, 144, 214, 216, 310, 312, 414, 416, 520 as illustrated in FIGS. 1-5.

In the illustrated example of FIG. 6, the shock wave manager 100 includes the example collection engine 600 to obtain, select, and process information (e.g., flight condition information, captured images, status information of an actuator or a control surface, etc.) related to monitoring a shock wave proximate a surface of an aircraft. The example collection engine 600 includes the flight condition manager 602 to obtain, select, and process flight condition information from an aircraft. For example, the flight condition manager 602 may obtain, select, and process the flight condition information from the sensor(s) 670 via the network 680. The sensor(s) 670 provide information regarding a flight condition of the aircraft. For example, the sensor(s) 670 may include an altimeter (e.g., to measure an altitude of the aircraft), a pitot tube (e.g., to measure an air speed of the aircraft), an angle of attack sensor (e.g., to measure an angle of attack of the aircraft), etc. Additionally or alternatively, the sensor(s) 670 may include an accelerometer, a gyro sensor, a temperature sensor, etc. to measure a flight condition of the aircraft.

In some examples, the flight condition manager 602 obtains a parameter of an actuator. For example, the flight condition manager 602 may obtain an engine speed, an amount of thrust, an amount of air intake, etc. of an engine. The example flight condition manager 602 may calculate an optimal parameter of the actuator. For example, the flight condition manager 602 may calculate an optimal engine speed, an optimal thrust parameter, etc. based on a position of a shock wave, a strength of a shock wave, a flight condition of the aircraft, etc. In some instances, the flight condition manager 602 obtains a position of a control surface. For example, the flight condition manager 602 may obtain a position of the slats 110, 112, the flaps 118, 120, the elevators 128, 130, etc. The example flight condition manager 602 may calculate an optimal position of a control surface. For example, the flight condition manager 602 may calculate an optimal position of the slats 110, 112, the flaps 118, 120, the elevators 128, 130, etc. based on a position of a shock wave, a strength of a shock wave, a flight condition of the aircraft, etc. The example flight condition manager 602 may store information in the example database 660 and/or obtain information from the database 660 such as, for example, the parameter (e.g., the current parameter, the optimal parameter, etc.) of the actuator, the position (e.g., the current position, the optimal position, etc.) of the control surface, etc.

The example collection engine 600 includes the example image recorder 604 to capture an image via the camera(s) 672. For example, the image recorder 604 may direct the camera(s) 672 to target the pattern 132 coupled to the surface of the wings 106, 108, the slats 110,112, the ailerons 114, 116, the flaps 118, 120 of FIG. 1. The example image recorder 604 may determine when to capture an image via the camera(s) 672 based on a time interval. For example, the image recorder 604 may determine to capture an image via the camera(s) 672 every control cycle of the shock wave manager 100 (e.g., every 100 milliseconds). Alternatively, the example image recorder 604 may determine when to capture an image via the camera(s) 672 based on an event. For example, the image recorder 604 may capture an image via the camera(s) 672 when an aircraft becomes stationary on a ground surface, when the aircraft performs a take-off or landing operation, when the aircraft exceeds an altitude threshold (e.g., the aircraft flies higher than 30,000 feet), etc. The example image recorder 604 may determine when to operate the light source(s) 674. For example, the image recorder 604 may operate the light source(s) 674 based on the sensor(s) 670 (e.g., a light sensor). In another example, the image recorder 604 may operate the light source(s) 674 based on an insufficiently illuminated image (e.g., when the aircraft is flying at night). The example image recorder 604 may store images in the example database 660.

In the illustrated example of FIG. 6, the shock wave manager 100 includes the image processor 610 to process an image captured by the camera(s) 672. The example image processor 610 may determine a number of control points and/or a number of scaling properties by creating a global object coordinate system in either a 2-D coordinate-based system or a 3-D coordinate-based system. The example image processor 610 may create the global object coordinate system based on a definition of one or more reference (e.g., control) points and/or reference lengths (e.g., scales). The example image processor 610 may process an image by calculating a set of reference point coordinates of a point of an object (e.g., a point of a speckled pattern) or a subdivision of the object (e.g., a collection of two or more points of a speckled pattern). The example image processor 610 may attach an identification designator to an image to identify the image based on a flight condition of the aircraft, a timestamp, etc. The identification designator may be, for example, a number increasing in value as additional images are captured, a timestamp, a camera designator (e.g., an identification of which camera captured the image), and/or a combination thereof. The example image processor 610 may store processed images in the database 660. The example image processor 610 may obtain unprocessed and/or previously processed images from the example database 660.

In the illustrated example of FIG. 6, the shock wave manager 100 includes the shock wave characterizer 620 to characterize a shock wave proximate a surface of an aircraft. For example, the shock wave characterizer 620 may determine a position and/or a strength of a shock wave proximate a pattern coupled to a surface of an actuator and/or a control surface of an aircraft. The example shock wave characterizer 620 includes the position calculator 622 to determine a position of a shock wave. For example, the position calculator 622 may calculate a position of a point (e.g., a point related to an object) in an image utilizing one or more photogrammetry techniques and/or BOS techniques as described above.

In some examples, the example position calculator 622 calculates a position of one or more points in an image during a baseline (e.g., a calibration) process. For example, the position calculator 622 may identify the pattern 132 in a reference image captured by the camera(s) 672 when the aircraft is stationary on a ground surface. The example position calculator 622 may segment the pattern 132 in the reference image into subdivisions. The example position calculator 622 may determine the position of each subdivision. In some instances, the position calculator 622 calculates a position of each of the subdivision when the pattern 132 is experiencing an effect of a shock wave. For example, the pattern 132 may be experiencing the effect of the shock wave when air surrounding the pattern 132 creates a distortion (e.g., an image distortion) of the subdivision, when the aircraft is traveling at a speed greater than a critical Mach number of the aircraft, etc.

In some instances, the position calculator 622 calculates an optimal position of a shock wave. For example, the position calculator 622 may identify a position of the shock wave 104 of FIG. 1. The example position calculator 622 may calculate an optimal position of the shock wave 104 based on a flight condition of the aircraft (e.g., an altitude, an air speed, a stagnation temperature (e.g., a total air temperature), etc.). In some instances, the position calculator 622 obtains the optimal position of the shock wave from a look-up table in the database 660. The look-up table may be generated during a baseline (e.g., a calibration) process, a manufacturing process (e.g., a wind tunnel test), etc. of the aircraft.

In some examples, the position calculator 622 determines whether a shape of a shock wave is distorted. For example, the position calculator 622 may identify a position of the shock wave 104 of FIG. 1. The example position calculator 622 may determine that the position of the shock wave 104 based on a flight condition of the aircraft 102 is inaccurate compared to a reference position of a shock wave obtained from the database 660 (e.g., a reference position from a look-up table) for the flight condition of the aircraft 102. For example, the discrepancy in the position of the shock wave 104 may be due to the right-side cameras 134, 136 of FIG. 1 capturing a blurred image of the pattern 132. For example, the distortion of the shock wave 104 may be due to ice-buildup on the pattern 132 coupled to the surface of the right-side wing 106. In another example, the distortion of the shock wave 104 may be due to debris-buildup (e.g., bugs, dirt, moisture, salt, etc.) on the pattern 132. In yet another example, the distortion of the shock wave 104 may be due to moisture buildup on an exterior or interior of a lens of the camera(s) 672.

In some examples, the position calculator 622 may adjust a position of a shock wave calculated by the one or more BOS techniques as described above based on a deformation of a surface of an aircraft. For example, the position calculator 622 may determine a deformation of the wing 106 of FIG. 1 based on using the one or more FOSS techniques as described above. Alternatively, the example position calculator 622 may determine the deformation of the wing 106 by obtaining an expected degree of deformation from the database 660, by using the one or more photogrammetry techniques as describe above, etc.

In the illustrated example of FIG. 6, the shock wave characterizer 620 includes the strength calculator 624 to determine a measure of strength of a shock wave. For example, the strength calculator 624 may calculate a strength of a shock wave proximate a pattern coupled to a surface of an actuator and/or a control surface of an aircraft. The example strength calculator 624 may utilize one or more photogrammetry techniques and/or BOS techniques as described above to determine the strength of the shock wave. For example, the strength calculator 624 may determine a first position of a point of the pattern 132 in a first image (e.g., a reference image). The example strength calculator 624 may determine a second position of the point of the pattern 132 in a second image (e.g., an image where the pattern is experiencing an effect of a shock wave). The example strength calculator 624 may utilize the relationships described above in Equation (1) and/or Equation (2) to determine a density (e.g., a density field) of air in the shock wave. The example strength calculator 624 may determine the strength of the shock wave based on the determined density of the air in the shock wave.

In some examples, the strength calculator 624 determines whether a shape of a shock wave is distorted. For example, the strength calculator 624 may identify a strength of the shock wave 104 of FIG. 1. The example strength calculator 624 may determine that the strength of the shock wave 104 based on a flight condition of the aircraft 102 is inaccurate compared to a reference strength of a shock wave obtained from the database 660 (e.g., from a look-up table) for the flight condition of the aircraft 102. For example, the discrepancy in the strength of the shock wave 104 may be due to the right-side cameras 134, 136 capturing a blurred image of the pattern 132. For example, the distortion of the shock wave 104 may be due to ice-buildup on the pattern 132 coupled to the surface of the right-side wing 106. In another example, the distortion of the shock wave 104 may be due to debris-buildup (e.g., bugs, dirt, moisture, salt, etc.) on the pattern 132. In yet another example, the distortion of the shock wave 104 may be due to moisture buildup on an exterior or interior of a lens of the camera(s) 672.

In some examples, the strength calculator 624 may adjust a strength of a shock wave calculated by the one or more BOS techniques as described above based on a deformation of a surface of an aircraft. For example, the strength calculator 624 may determine a deformation of the wing 106 of FIG. 1 based on using the one or more FOSS techniques as described above. Alternatively, the example strength calculator 624 may determine the deformation of the wing 106 by obtaining an expected degree of deformation from the database 660, by using the one or more photogrammetry techniques as describe above, etc.

In the illustrated example of FIG. 6, the shock wave manager 100 includes the difference calculator 630 to calculate a difference between characterizations of a shock wave. The example difference calculator 630 may also determine whether the difference satisfies a threshold. For example, the difference calculator 630 may calculate a difference (e.g., a shock wave strength difference) between a first measure of strength of a shock wave during a first time period and a second measure of strength of the shock wave during a second time period. The example difference calculator 630 may determine whether the strength difference satisfies a threshold (e.g., the difference between the density of the air in the shock waves is greater than 0.2 kg/m$^3$). Additionally or alternatively, the example difference calculator 630 may calculate a difference (e.g., a shock wave position difference) between a first position of the shock wave during the first time period and a second position of the shock wave during the first time period. The example difference calculator 630 may determine whether the position difference satisfies a threshold (e.g., the position difference is greater than 5.5 millimeters).

In some examples, the difference calculator 630 calculates a difference between (1) an image captured by the camera(s) 672 when a surface of an aircraft is experiencing an effect of a shock wave and (2) a reference image captured by the camera(s) 672 when the surface of the aircraft is not experiencing an effect of a shock wave. For example, the difference calculator 630 may calculate a difference between (1) a position of a point on the pattern 132 when the pattern 132 coupled to a surface of an aircraft is experiencing an effect of a shock wave and (2) a position of the point on the pattern 132 coupled to the surface of the aircraft when the pattern 132 is not experiencing an effect of the shock wave. Additionally or alternatively, the example difference calculator 630 may calculate a difference between refractive indices, incidence angles, refractive angles, and/or densities of different mediums.

In some instances, the difference calculator 630 calculates differences of parameters of one or more actuators. For example, the difference calculator 630 may calculate a difference between a first engine speed of the left-side engine 402 and a second engine speed of the left-side engine 402. In another example, the difference calculator 630 may calculate a difference between a first engine speed of the left-side engine 402 and a first engine speed of the right-side engine 404. In yet another example, the difference calculator 630 may calculate a difference between a first thrust parameter of the left-side engine 402 (e.g., an amount of thrust generated by the left-side engine 402) and a second thrust parameter of the left-side engine 402.

In some examples, the difference calculator 630 calculates differences of positions of one or more control surfaces. For example, the difference calculator 630 may calculate a difference between a first position of a control surface (e.g., the elevator 128) and a second position of the control surface. In another example, the difference calculator 630 may calculate a difference between a first position of a first control surface (e.g., the elevator 128) and a first position of a second control surface (e.g., the elevator 130). The example difference calculator 630 may determine whether the difference of the positions of the one or more control surfaces satisfies a threshold. For example, the difference calculator 630 may determine whether the difference between the first position of a first control surface and the second position of the first control surface satisfies a threshold (e.g., the difference is greater than 10%). The first position may be an actual or current position of the control surface, whereas the second position may be an estimated or an optimal position of the control surface based on a position and/or a strength of a shock wave. The example difference calculator 630 may store calculated differences in the example database 660 and/or obtain calculated differences from the database 660. The example difference calculator 630 may obtain information used to calculate a difference from the database 660. For example, the difference calculator 630 may obtain a parameter of an actuator, a position of a control surface, a density, a refractive index, etc. from the database 660.

In the illustrated example of FIG. 6, the shock wave manager 100 includes the command generator 640 to generate a command to control an actuator and/or a control surface of an aircraft based on a characterization of a shock wave. For example, the command generator 640 may generate a command to adjust (e.g., control) a parameter (e.g., an engine speed) of the engines 402, 404 based on a position and/or a strength of the shock wave 400 as illustrated in FIG. 4. In another example, the command generator 640 may generate a command to control a position of the slats 110, 112, the ailerons 114, 116, the flaps 118, 120, etc. based on a position and/or a strength of the shock wave 104 as illustrated in FIG. 1. In some examples, the command generator 640 transmits the command to the actuator and/or the control surface. In some instances, the command generator 640 transmits the command to an aircraft control system to direct the aircraft control system to control the actuator and/or the control surface based on the command.

In the illustrated example of FIG. 6, the shock wave manager 100 includes the alert generator 650 to generate an alert based on information (e.g., flight condition information, position information of a shock wave, strength information of a shock wave, etc.) obtained from the collection engine 600 and/or the database 660. In some examples, the alert generator 650 may evaluate the information and determine whether the information satisfies a threshold. The threshold may be a calculated value, a pre-determined value, etc. For example, the alert generator 650 may determine that a measured value for a strength of a shock wave satisfies a threshold (e.g., a density of a shock wave is greater than a density of air at 10,000 feet).

In some examples, the alert generator 650 generates an alert based on a difference. For example, the alert generator 650 may generate an alert based on a position difference calculated by the difference calculator 630 satisfies a threshold (e.g., a position difference greater than 5.5 millimeters). In another example, the alert generator 650 may generate an alert based on a strength difference calculated by the difference calculator 630 satisfies a threshold (e.g., a density difference greater than 0.2 kg/m$^3$). In some instances, the alert generator 650 generates an alert based on a distortion of a shock wave. For example, the alert generator 650 may generate an alert based on a shock wave having a distorted shape (e.g., a density field including a non-linearity) compared to an expected shape of the shock wave. For example, the alert generator 650 may generate an alert based on the distorted shape, where the alert may include a bug build-up message (e.g., bugs have built up on a surface of the aircraft), an ice build-up message (e.g., ice has built up on a surface of the aircraft), etc. In another example, the alert generator 650 may generate an alert based on a Mach number difference. For example, the alert generator 650 may generate an alert based on a difference between (1) a Mach number calculated based on a position and/or a strength of a shock wave and (2) a Mach number obtained by the sensor(s) 670 (e.g., a Mach sensor, a pitot tube, etc.).

In some instances, the alert generator 650 generates an alert based on a Mach number difference calculated by the difference calculator 630. For example, the alert generator 650 may generate an alert based on a difference between a (1) Mach number calculated by the sensor(s) 670 (e.g., the Mach sensor, the pitot tube, etc.) and a (2) Mach number calculated by the flight condition manager 602 based on a position and/or a strength of a shock wave. The alert generator 650 may generate an alert based on the difference satisfying a threshold (e.g., the difference is greater than Mach 0.1). In some examples, the alert generator 650 generates an alert based on uneven performance of one or more engines. For example, the alert generator 650 may generate an alert based on a first engine on a first side of an aircraft performing sub-optimally (e.g., actual air intake is greater than an expected air intake) compared to a second engine on a second side of the aircraft, the second side opposite the first. In some examples, the alert generator 650 may transmit the alert to a sub-display, a sub-module, etc. of a human machine interface (HMI) in the cockpit of the aircraft. A pilot in the cockpit may interact with the HMI, where the pilot may acknowledge the alert, dismiss the alert, conduct an action based on the alert, review an alert report, review an alert trend analysis, etc.

In the illustrated example of FIG. 6, the shock wave manager 100 includes the database 660 to record data (e.g., obtained flight condition information, obtained images, calculated positions of shock waves, calculated strengths of shock waves, generated commands, etc.). In some examples, the database 660 includes one or more look-up tables. For example, the look-up tables may include reference positions of a shock wave for an aircraft, reference strengths of a shock wave for the aircraft, optimal positions, and/or optimal strengths of a shock wave for the aircraft, etc. In some instances, the look-up tables include optimal parameters for actuators and optimal positions for control surfaces based on a flight condition of the aircraft, a position of a shock wave, a strength of a shock wave, etc. The database 660 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 660 may additionally or alternatively be implemented by one or more double data rate (DDR) memories, such as DDR, DDR2, DDR3, mobile DDR (mDDR), etc. The database 660 may additionally or alternatively be implemented by one or more mass storage devices such as hard disk drive(s), compact disk drive(s) digital versatile disk drive(s), etc. While in the example the database 660 is illustrated as a single database, the database 660 may be implemented by any number and/or type(s) of databases.

In the illustrated example of FIG. 6, the shock wave manager 100 is communicatively coupled to the sensor(s) 670, the camera(s) 672, the light source(s) 674 via the network 680. The network 680 of the illustrated example of FIG. 6 is an aircraft process control network. However, the example network 680 may be implemented using any suitable wired and/or wireless network(s) including, for example, one or more data buses, one or more aircraft process control networks, one or more Local Area Networks (LANs), one or more wireless LANs, one or more cellular networks, one or more private networks, one or more public networks, etc. As used herein, the phrases "in communication" and/or "communicatively coupled" including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

While an example manner of implementing the shock wave manager 100 of FIGS. 1-5 is illustrated in FIG. 6, one or more of the elements, processes and/or devices illustrated in FIG. 6 may be combined, divided, re-arranged, omitted, eliminated, and/or implemented in any other way. Further, the example collection engine 600, the example flight condition manager 602, the example image recorder 604, the example image processor 610, the example shock wave characterizer 620, the example position calculator 622, the example strength calculator 624, the example difference calculator 630, the example command generator 640, the example alert generator 650, the example database 660, and/or, more generally, the example shock wave manager 100 of FIG. 6 may be implemented by hardware, software, firmware and/or any combination of hardware, software and/or firmware. Thus, for example, any of the example collection engine 600, the example flight condition manager 602, the example image recorder 604, the example image processor 610, the example shock wave characterizer 620, the example position calculator 622, the example strength calculator 624, the example difference calculator 630, the example command generator 640, the example alert generator 650, the example database 660, and/or, more generally, the example shock wave manager 100 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 600, the example flight condition manager 602, the example image recorder 604, the example image processor 610, the example shock wave characterizer 620, the example position calculator 622, the example strength calculator 624, the example difference calculator 630, the example command generator 640, the example alert generator 650, the example database 660, and/or, more generally, the example shock wave manager 100 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example shock wave manager 100 of FIG. 6 may include one or more elements, processes and/or devices in addition to, or instead of, those illustrated in FIG. 6, and/or may include more than one of any or all of the illustrated elements, processes, and devices.

Flowcharts representative of example methods for implementing the example shock wave manager 100 of FIG. 6 are shown in FIGS. 7-12. In these examples, the methods may be implemented using machine readable instructions that comprise a program for execution by a processor such as the processor 1312 shown in the example processor platform 1300 discussed below in connection with FIG. 13. The program may be embodied in software stored on a tangible computer-readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 7-12, many other methods of implementing the example shock wave manager 100 may alternatively be used. For example, the order of execution of the blocks may be changed, and/or some of the blocks described may be changed, eliminated, or combined.

As mentioned above, the example methods of FIGS. 7-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 7-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 7:
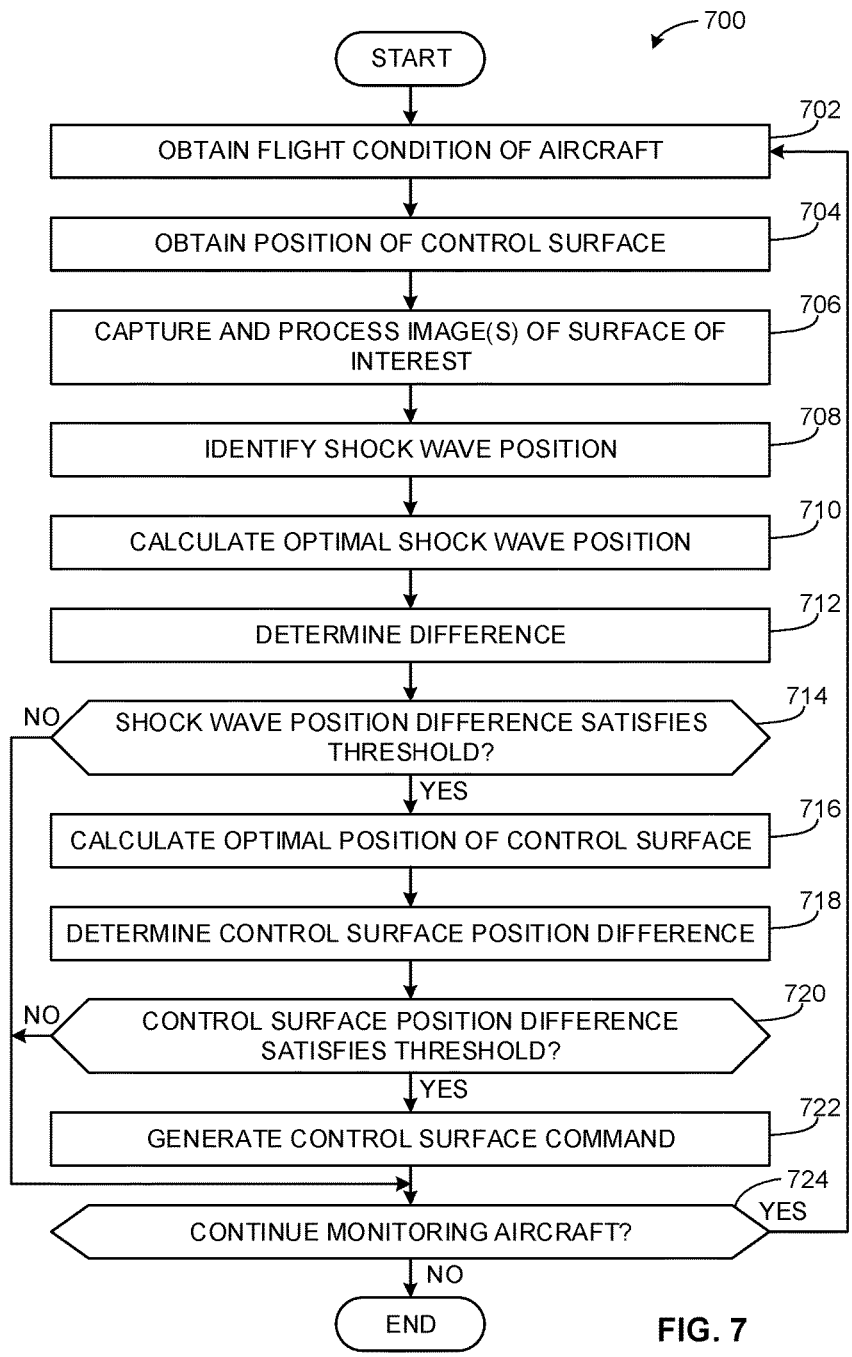
FIGS. 7-12 are flowcharts representative of example methods that may be executed by the example shock wave manager apparatus of FIG. 6 to monitor a shock wave proximate a transonic surface of an example aircraft.

FIG. 7 is a flowchart representative of an example method 700 that may be performed by the example shock wave manager 100 of FIGS. 1-5 to activate (control) a control surface of an aircraft based on a position of a shock wave proximate a surface of the aircraft. The example method 700 begins at block 702 when the example shock wave manager 100 obtains a flight condition of an aircraft. For example, the flight condition manager 602 may obtain an altitude, an air speed, an engine speed, etc. of the aircraft 102. At block 704, the example shock wave manager 100 obtains a position of a control surface. For example, the flight condition manager 602 may obtain a position of the elevator 128 of the aircraft 102 of FIG. 3.

At block 706, the example shock wave manager 100 captures and processes image(s) of a surface of interest. For example, the image recorder 604 may capture a first image of the pattern 132 coupled to the surface of the elevator 128 via the right-side camera 306 of FIG. 3 during a time period (e.g., when the aircraft is flying above 30,000 feet). The example image recorder 604 may also capture a second image of the pattern 132 coupled to the surface of the elevator 128 via the right-side camera 308 of FIG. 3 during the same time period. The example image processor 610 may process the first image and the second image. At block 708, the example shock wave manager 100 identifies a shock wave position. For example, the shock wave characterizer 620 may employ the position calculator 622 to identify a position of the shock wave 300 proximate the pattern 132 coupled to the surface of the elevator 128 of FIG. 3 via one or more deformation compensation techniques or BOS techniques as described above.

At block 710, the example shock wave manager 100 calculates an optimal shock wave position. For example, the position calculator 622 may calculate an optimal position of the shock wave 300 based on the obtained flight condition of the aircraft 102. At block 712, the example shock wave manager 100 determines a shock wave position difference. For example, the difference calculator 630 may calculate a difference between (1) the position of the shock wave 300 as determined by the position calculator 622 and (2) the optimal position of the shock wave 300 as determined by the position calculator 622.

At block 714, the example shock wave manager 100 determines whether the shock wave position difference satisfies a threshold. For example, the difference calculator 630 may determine whether the shock wave position difference satisfies a threshold (e.g., the difference is greater than 5.5 millimeters). If, at block 714, the example shock wave manager 100 determines that the shock wave position difference does not satisfy the threshold, control proceeds to block 724 to determine whether to continue monitoring the aircraft. If, at block 714, the example shock wave manager 100 determines that the shock wave position difference does satisfy the threshold, then, at block 716, the shock wave manager 100 calculates an optimal position of the control surface. For example, the flight condition manager 602 may calculate an optimal position of the elevator 128 based on the optimal position of the shock wave 300.

At block 718, the example shock wave manager 100 determines a control surface position difference. For example, the difference calculator 630 may determine a difference between (1) the position of the elevator 128 and (2) the optimal position of the elevator 128. At block 720, the example shock wave manager 100 determines whether the control surface position difference satisfies a threshold. For example, the difference calculator 630 may determine that the difference between (1) the position of the elevator 128 and (2) the optimal position of the elevator 128 satisfies a threshold (e.g., the difference is greater than 10%). If, at block 720, the example shock wave manager 100 determines that the control surface position difference does not satisfy the threshold, control proceeds to block 724 to determine whether to continue monitoring the aircraft. If, at block 720, the example shock wave manager 100 determines that the control surface position difference does satisfy the threshold, then, at block 722, the shock wave manager 100 generates a control surface command. For example, the command generator 640 may generate a command to move the elevator 128 from a first position to a second position. The first position may be an actual (e.g., a current) position of the elevator 128. The second position may be the optimal position of the elevator 128 as calculated by the flight condition manager 602.

At block 724, the example shock wave manager 100 determines whether to continue monitoring the aircraft. For example, the flight condition manager 602 may determine that the aircraft 102 is still flying above 30,000 feet, the aircraft 102 does not have landing gear deployed (e.g., the aircraft 102 is in flight), etc. If, at block 724, the example shock wave manager 100 determines to continue monitoring the aircraft, control returns to block 702 to obtain another flight condition of the aircraft, otherwise the example method 700 concludes.

Figure 8:
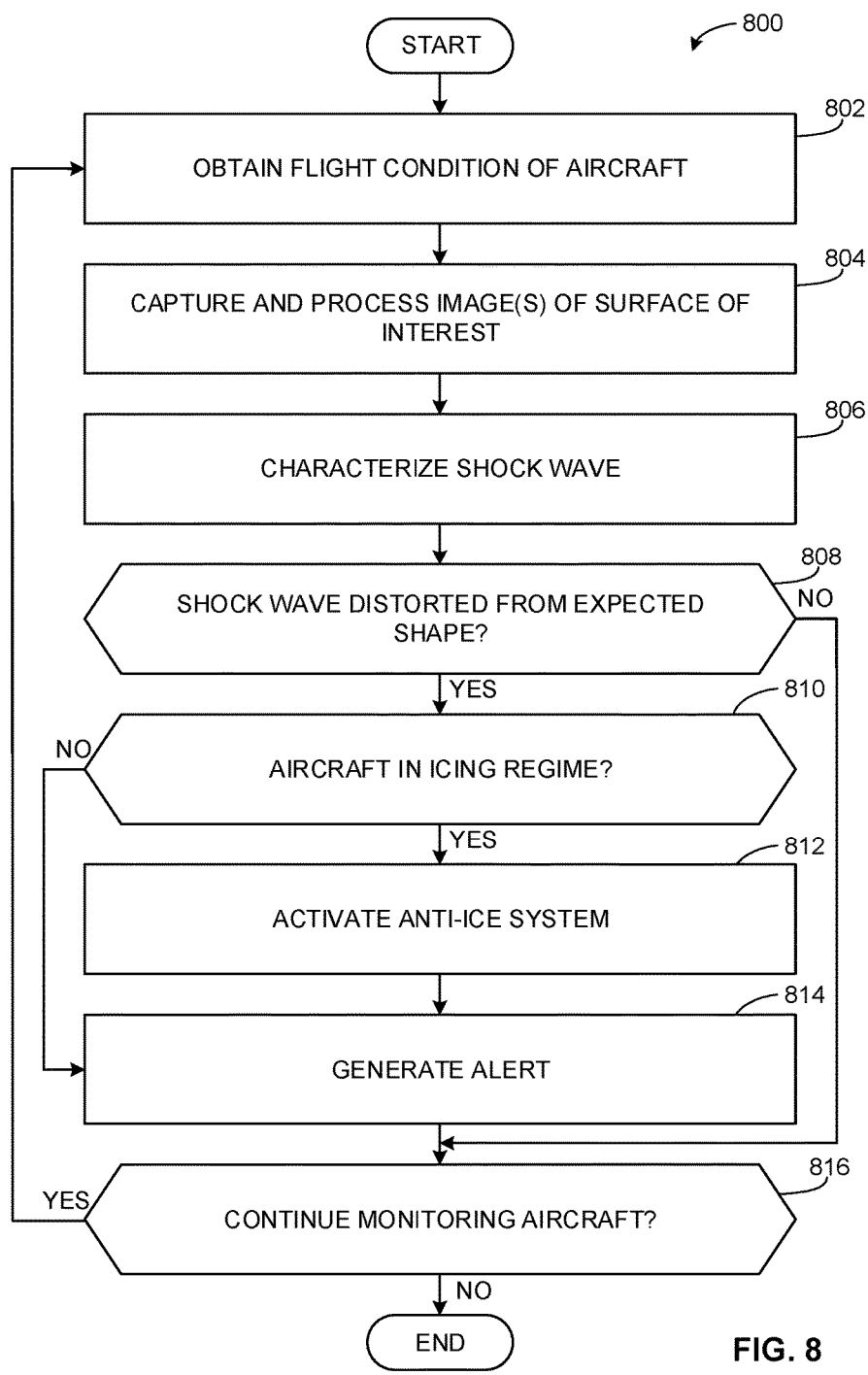

FIG. 8 is a flowchart representative of an example method 800 that may be performed by the example shock wave manager 100 of FIGS. 1-5 to determine whether to activate (control) a system (e.g., an anti-ice system) of an aircraft based on a position of a shock wave proximate a surface of the aircraft. The example method 800 begins at block 802 when the example shock wave manager 100 obtains a flight condition of an aircraft. For example, the flight condition manager 602 may obtain an altitude, an air speed, an engine speed, etc. of the aircraft 102.

At block 804, the example shock wave manager 100 captures and processes image(s) of a surface of interest. For example, the image recorder 604 may capture a first image of the pattern 132 coupled to the surface of the right-side wing 106 via the right-side camera 134 of FIG. 1 during a time period (e.g., when the aircraft is flying above 30,000 feet). The example image recorder 604 may also capture a second image of the pattern 132 coupled to the surface of the right-side wing 106 via the right-side camera 136 of FIG. 1 during the same time period. The example image processor 610 may process the first image and the second image. At block 806, the example shock wave manager 100 characterizes a shock wave. For example, the shock wave characterizer 620 may employ the position calculator 622 to identify a position of the shock wave 104 proximate the pattern 132 coupled to the surface of the right-side wing 106 of FIG. 1 via one or more deformation compensation techniques or BOS techniques as described above. In another example, the shock wave characterizer 620 may employ the strength calculator 624 to calculate a strength of the shock wave 104 via one or more deformation compensation techniques or BOS techniques as described above.

At block 808, the example shock wave manager 100 determines whether the shock wave is distorted from an expected shape. For example, the position calculator 622 may determine that the shock wave 104 is distorted based on the position of the shock wave 104 compared to an expected position of the shock wave 104. In another example, the strength calculator 624 may determine that the shock wave 104 is distorted based on the strength of the shock wave 104 compared to an expected strength of the shock wave 104. If, at block 808, the example shock wave manager 100 determines that the shock wave is not distorted from the expected shape, control proceeds to block 816 to determine whether to continue monitoring the aircraft. If, at block 808, the example shock wave manager 100 determines that the shock wave is distorted from the expected shape, then, at block 810, the shock wave manager 100 determines whether the aircraft is in an icing regime. For example, the flight condition manager 602 may determine that the aircraft 102 is flying above 30,000 feet, the total air temperature is below freezing, etc.

If, at block 810, the example shock wave manager 100 determines that the aircraft is not in the icing regime, control proceeds to block 814 to generate an alert. If, at block 810, the example shock wave manager 100 determines that the aircraft is in the icing regime, then, at block 812, the shock wave manager 100 activates an anti-ice system. For example, the command generator 640 may generate a command to activate an anti-ice system of the aircraft 102. The example command generator 640 may transmit the command to a control system of the aircraft 102 to activate the anti-ice system. At block 814, the example shock wave manager 100 generates an alert. For example, the alert generator 650 may generate an alert indicating that the aircraft 102 is in the icing regime, that the shock wave manager 100 generated a command to active the anti-ice system of the aircraft 102, that the shock wave 104 is distorted not because of complications due to ice build-up, etc.

At block 816, the example shock wave manager 100 determines whether to continue monitoring the aircraft. For example, the flight condition manager 602 may determine that the aircraft 102 is still flying above 30,000 feet, the aircraft 102 does not have landing gear deployed (e.g., the aircraft 102 is in flight), etc. If, at block 816, the example shock wave manager 100 determines to continue monitoring the aircraft, control returns to block 802 to obtain another flight condition of the aircraft, otherwise the example method 800 concludes.

Figure 9:
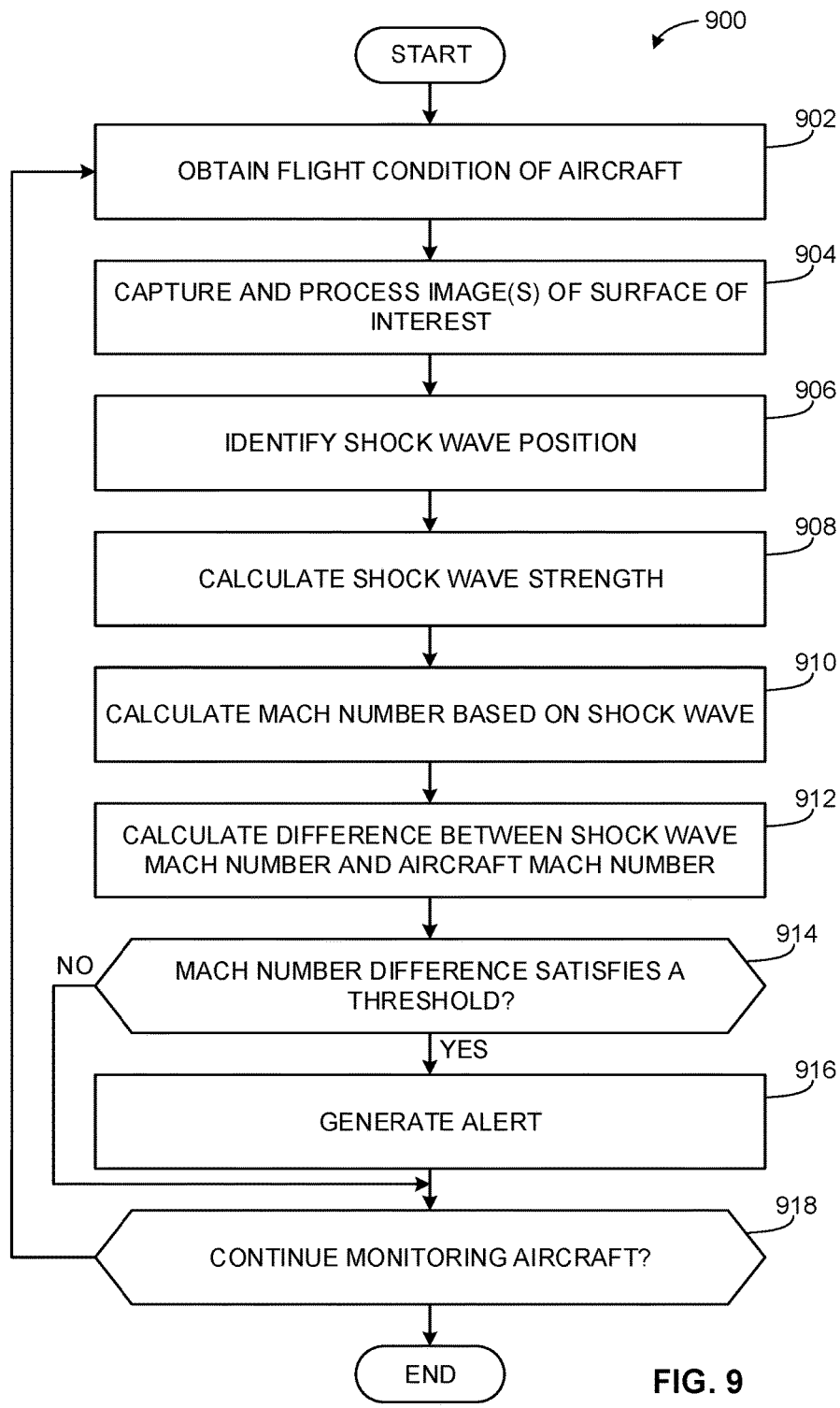

FIG. 9 is a flowchart representative of an example method 900 that may be performed by the example shock wave manager 100 of FIGS. 1-5 to calculate a Mach number based on a shock wave proximate a surface of the aircraft. The example method 900 begins at block 902 when the example shock wave manager 100 obtains a flight condition of an aircraft. For example, the flight condition manager 602 may obtain an altitude, an air speed, an engine speed, etc. of the aircraft 102.

At block 904, the example shock wave manager 100 captures and processes image(s) of a surface of interest. For example, the image recorder 604 may capture a first image of the pattern 132 coupled to the surface of the right-side wing 106 via the right-side camera 134 of FIG. 1 during a time period (e.g., when the aircraft is flying above 30,000 feet). The example image recorder 604 may also capture a second image of the pattern 132 coupled to the surface of the right-side wing 106 via the right-side camera 136 of FIG. 1 during the same time period. The example image processor 610 may process the first image and the second image.

At block 906, the example shock wave manager 100 identifies a shock wave position. For example, the shock wave characterizer 620 may employ the position calculator 622 to identify a position of the shock wave 104 proximate the pattern 132 coupled to the surface of the right-side wing 106 of FIG. 1 via one or more deformation compensation techniques or BOS techniques as described above. At block 908, the example shock wave manager 100 calculates a shock wave strength. For example, the strength calculator 624 may determine a measured value of strength for the shock wave 104 based on one or more relationships as described above in Equation (1) and/or Equation (2).

At block 910, the example shock wave manager 100 calculates a Mach number based on the shock wave. For example, the flight condition manager 602 may calculate a Mach number based on a position and/or a strength of the shock wave 104 of FIG. 1. At block 912, the example shock wave manager 100 calculates a difference between a shock wave Mach number and an aircraft Mach number. For example, the difference calculator 630 may calculate a difference between (1) a Mach number based on the position and/or the strength of the shock wave 104 and (2) a Mach number based on a sensor 670 (e.g., a Mach sensor, a pitot tube, etc.).

At block 914, the example shock wave manager 100 determines whether the Mach number difference satisfies a threshold. For example, the alert generator 650 may determine whether the Mach number difference satisfies a threshold (e.g., the Mach number difference is greater than 0.1). If, at block 914, the example shock wave manager 100 determines that the Mach number difference does not satisfy the threshold, control proceeds to block 918 to determine whether to continue monitoring the aircraft. If, at block 914, the example shock wave manager 100 determines that the Mach number difference does satisfy the threshold, then, at block 916, the shock wave manager 100 generates an alert. For example, the alert generator 650 may generate an alert indicating that the Mach sensor is inaccurate, the one or more control surfaces of the aircraft (e.g., the slats 110, 112, the flaps 118, 120, etc.) are non-responsive (e.g., non-operational, feedback from the control surface is not available), etc.

At block 918, the example shock wave manager 100 determines whether to continue monitoring the aircraft. For example, the flight condition manager 602 may determine that the aircraft 102 is still flying above 30,000 feet, the aircraft 102 does not have landing gear deployed (e.g., the aircraft 102 is in flight), etc. If, at block 918, the example shock wave manager 100 determines to continue monitoring the aircraft, control returns to block 902 to obtain another flight condition of the aircraft, otherwise the example method 900 concludes.

Figure 10:
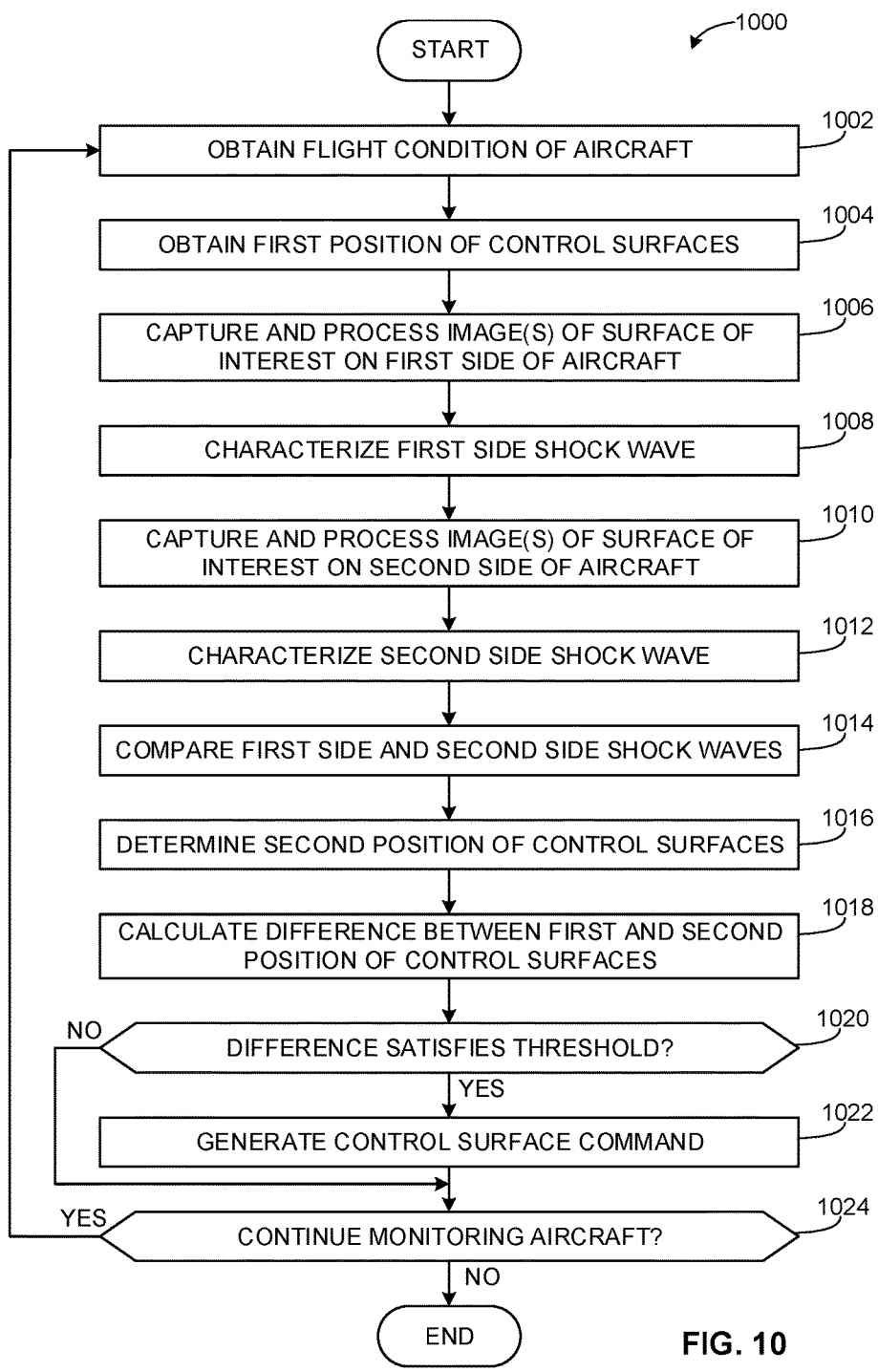

FIG. 10 is a flowchart representative of an example method 1000 that may be performed by the example shock wave manager 100 of FIGS. 1-5 to activate (control) a control surface of an aircraft based on a position of a first shock wave proximate a first surface on a first side of the aircraft compared to a position of a second shock wave proximate a second surface on a second side of the aircraft. The example method 1000 begins at block 1002 when the example shock wave manager 100 obtains a flight condition of an aircraft. For example, the flight condition manager 602 may obtain an altitude, an air speed, an engine speed, etc. of the aircraft 102. At block 1004, the example shock wave manager 100 obtains a first position of control surfaces. For example, the flight condition manager 602 may obtain a first position of the elevator 128 of the aircraft 102 of FIG. 3 and a first position of the elevator 130 of the aircraft 102 of FIG. 3.

At block 1006, the example shock wave manager 100 captures and processes image(s) of a surface of interest on a first side of the aircraft. For example, the image recorder 604 may capture a first image of the pattern 132 coupled to the surface of the elevator 128 via the right-side camera 306 of FIG. 3 during a first time period (e.g., when the aircraft is flying above 30,000 feet). The example image recorder 604 may capture a second image of the pattern 132 coupled to the surface of the elevator 128 via the right-side camera 308 of FIG. 3 during the first time period. The example image processor 610 may process the first image and the second image. At block 1008, the example shock wave manager 100 characterizes a first side shock wave. For example, the shock wave characterizer 620 may employ the position calculator 622 to identify a position of a first shock wave proximate the pattern 132 coupled to the surface of the elevator 128 of FIG. 3 via one or more deformation compensation techniques or BOS techniques as described above. In another example, the shock wave characterizer 620 may employ the strength calculator 624 to determine a strength of the first shock wave.

At block 1010, the example shock wave manager 100 captures and processes image(s) of a surface of interest on a second side of the aircraft. For example, the image recorder 604 may capture a third image of the pattern 132 coupled to the surface of the elevator 130 via the left-side camera 302 of FIG. 3 during the first time period (e.g., when the aircraft is flying above 30,000 feet). The example image recorder 604 may capture a fourth image of the pattern 132 coupled to the surface of the elevator 130 via the left-side camera 304 of FIG. 3 during the first time period. The example image processor 610 may process the third image and the fourth image. At block 1012, the example shock wave manager 100 characterizes a second side shock wave. For example, the shock wave characterizer 620 may employ the position calculator 622 to identify a position of a second shock wave (e.g., the shock wave 300) proximate the pattern 132 coupled to the surface of the elevator 130 of FIG. 3 via one or more deformation compensation techniques or BOS techniques as described above. In another example, the shock wave characterizer 620 may employ the strength calculator 624 to determine a strength of the second shock wave (e.g., the shock wave 300).

At block 1014, the example shock wave manager 100 compares the first side and the second side shock waves. For example, the difference calculator 630 may calculate a difference between (1) the strength of the first shock wave and (2) the strength of the second shock wave. At block 1016, the example shock wave manager 100 determines a second position of the control surfaces. For example, the flight condition manager 602 may obtain a second position of the elevator 128 of the aircraft 102 of FIG. 3 and a second position of the elevator 130 of the aircraft 102 of FIG. 3. The second position may be an optimal position based on the position and/or the strength of the first and/or second shock waves. The example flight condition manager 602 may obtain the second position from the database 660.

At block 1018, the example shock wave manager 100 calculates a difference between the first and second position of the control surfaces. For example, the difference calculator 630 may calculate a difference between (1) the first position of the elevator 128 and (2) the second position of the elevator 128. In another example, the difference calculator 630 may calculate a difference between (1) the first position of the elevator 130 and (2) the second position of the elevator 130. At block 1020, the example shock wave manager 100 determines whether the difference satisfies a threshold. For example, the difference calculator 630 may determine whether the difference between (1) the first position of the elevator 128 and (2) the second position of the elevator 128 satisfies a threshold (e.g., the difference is greater than 10%).

If, at block 1020, the example shock wave manager 100 determines that the difference does not satisfy the threshold, control proceeds to block 1024 to determine whether to continue monitoring the aircraft. If, at block 1020, the example shock wave manager 100 determines that the difference does satisfy the threshold, then, at block 1022, the shock wave manager 100 generates a control surface command. For example, the command generator 640 may generate a command to move the elevator 128 from the first position to the second position. In another example, the command generator 640 may generate a command to move the elevator 130 from the first position to the second position.

At block 1024, the example shock wave manager 100 determines whether to continue monitoring the aircraft. For example, the flight condition manager 602 may determine that the aircraft 102 is still flying above 30,000 feet, the aircraft 102 does not have landing gear deployed (e.g., the aircraft 102 is in flight), etc. If, at block 1024, the example shock wave manager 100 determines to continue monitoring the aircraft, control returns to block 1002 to obtain another flight condition of the aircraft, otherwise the example method 1000 concludes.

Figure 11:
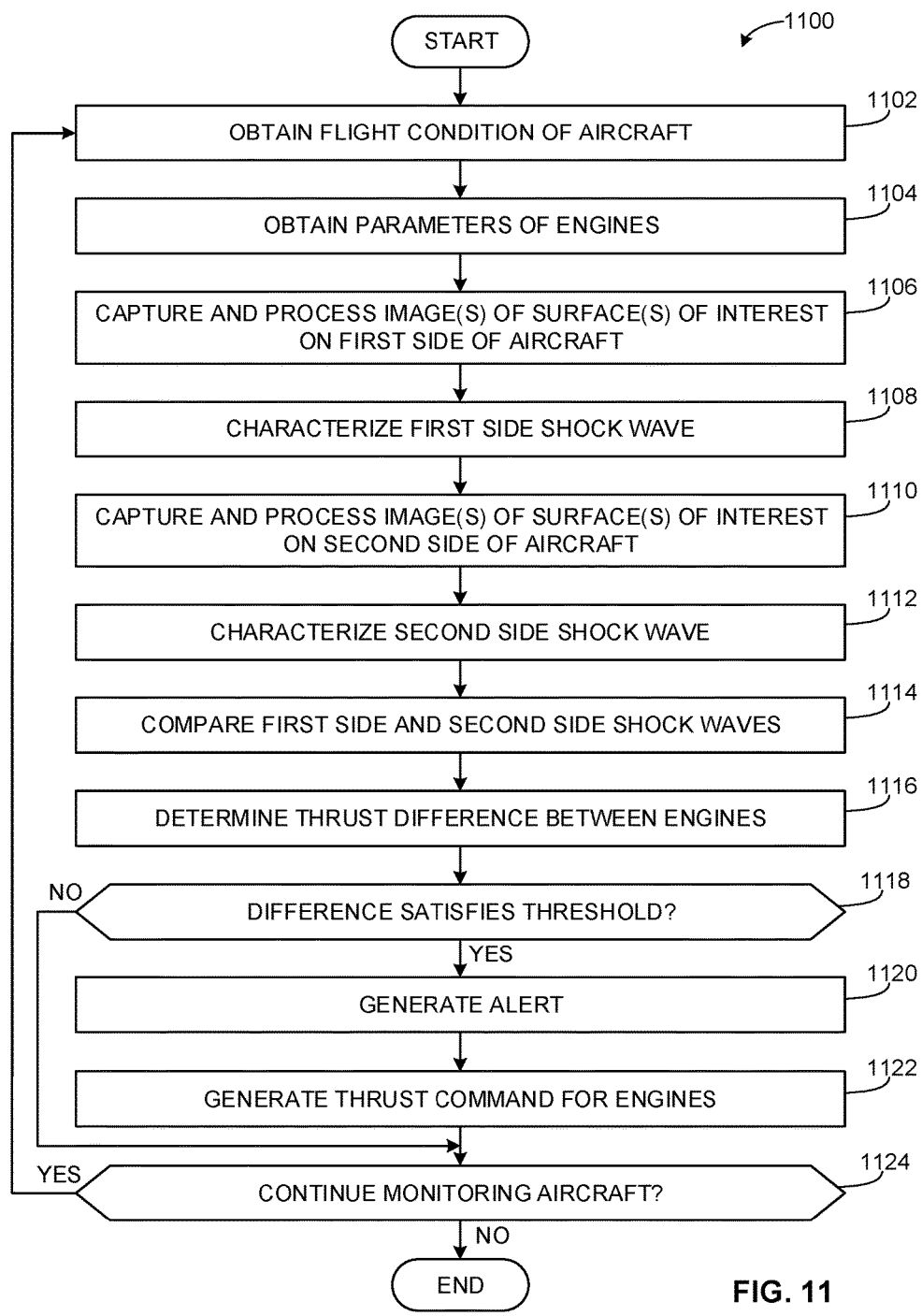

FIG. 11 is a flowchart representative of an example method 1100 that may be performed by the example shock wave manager 100 of FIGS. 1-5 to control an actuator (e.g., an engine) of an aircraft based on a position of a first shock wave proximate a first surface on a first side of the aircraft compared to a position of a second shock wave proximate a second surface on a second side of the aircraft. The example method 1100 begins at block 1102 when the example shock wave manager 100 obtains a flight condition of an aircraft. For example, the flight condition manager 602 may obtain an altitude, an air speed, an engine speed, etc. of the aircraft 102. At block 1104, the example shock wave manager 100 obtains parameters of engines. For example, the flight condition manager 602 may obtain a first engine speed of the left-side engine 402 of the aircraft 102 of FIG. 4 and a first engine speed of the right-side engine 404 of the aircraft 102 of FIG. 4.

At block 1106, the example shock wave manager 100 captures and processes image(s) of a surface of interest on a first side of the aircraft. For example, the image recorder 604 may capture a first image of the pattern 132 coupled to the surface of the left-side engine 402 via the left-side camera 406 of FIG. 4 during a first time period (e.g., when the aircraft is flying above 30,000 feet). The example image recorder 604 may capture a second image of the pattern 132 coupled to the surface of the left-side engine 402 via the left-side camera 408 of FIG. 4 during the first time period. The example image processor 610 may process the first image and the second image. At block 1108, the example shock wave manager 100 characterizes a first side shock wave. For example, the shock wave characterizer 620 may employ the position calculator 622 to identify a position of a first shock wave (e.g., the shock wave 400) proximate the pattern 132 coupled to the surface of the left-side engine 402 of FIG. 4 via one or more deformation compensation techniques or BOS techniques as described above. In another example, the shock wave characterizer 620 may employ the strength calculator 624 to determine a strength of the first shock wave (e.g., the shock wave 400) via one or more deformation compensation techniques or BOS techniques as described above.

At block 1110, the example shock wave manager 100 captures and processes image(s) of a surface of interest on a second side of the aircraft. For example, the image recorder 604 may capture a third image of the pattern 132 coupled to the surface of the right-side engine 404 via the right-side camera 410 of FIG. 4 during the first time period (e.g., when the aircraft is flying above 30,000 feet). The example image recorder 604 may capture a fourth image of the pattern 132 coupled to the surface of the right-side engine 404 via the right-side camera 412 of FIG. 4 during the first time period. The example image processor 610 may process the third image and the fourth image. At block 1112, the example shock wave manager 100 characterizes a second side shock wave. For example, the shock wave characterizer 620 may employ the position calculator 622 to identify a position of a second shock wave proximate the pattern 132 coupled to the surface of the right-side engine 404 of FIG. 4 via one or more deformation compensation techniques or BOS techniques as described above. In another example, the shock wave characterizer 620 may employ the strength calculator 624 to determine a strength of the second shock wave (e.g., the shock wave 300) via one or more deformation compensation techniques or BOS techniques as described above.

At block 1114, the example shock wave manager 100 compares the first side and the second side shock waves. For example, the difference calculator 630 may calculate a difference between (1) the strength of the first shock wave and (2) the strength of the second shock wave. At block 1116, the example shock wave manager 100 determines a thrust difference between the engines. For example, the flight condition manager 602 may determine a difference between (1) a first amount of thrust generated by the left-side engine 402 and (2) a second amount of thrust generated by the right-side engine 404. The first and second amount of thrust may be based on the position and/or the strength of the first and second shock waves.

At block 1118, the example shock wave manager 100 determines whether the thrust difference satisfies a threshold. For example, the difference calculator 630 may determine whether the difference between the first and the second amount of thrust satisfies a threshold (e.g., the thrust difference is greater than 100 newtons). If, at block 1118, the example shock wave manager 100 determines that the thrust difference does not satisfy the threshold, control proceeds to block 1124 to determine whether to continue monitoring the aircraft 102. If, at block 1118, the example shock wave manager 100 determines that the thrust difference does satisfy the threshold, then, at block 1120, the shock wave manager 100 generates an alert. For example, the alert generator 650 may generate an alert indicating that the amount of thrust generated by the left-side engine 402 is different than the amount of thrust generated by the right-side engine 404 beyond a tolerance level (e.g., the difference is greater than the threshold).

At block 1122, the example shock wave manager 100 generates a thrust command for the engines. For example, the command generator 640 may generate a first thrust command to the left-side engine 402 and/or a second thrust command to the right-side engine 404. The first thrust command may adjust the left-side engine 402 to adjust from the first engine speed to a second engine speed. The second thrust command may adjust the right-side engine 404 to adjust from the first engine speed to a second engine speed.

At block 1124, the example shock wave manager 100 determines whether to continue monitoring the aircraft. For example, the flight condition manager 602 may determine that the aircraft 102 is still flying above 30,000 feet, the aircraft 102 does not have landing gear deployed (e.g., the aircraft 102 is in flight), etc. If, at block 1124, the example shock wave manager 100 determines to continue monitoring the aircraft, control returns to block 1102 to obtain another flight condition of the aircraft, otherwise the example method 1100 concludes.

Figure 12:
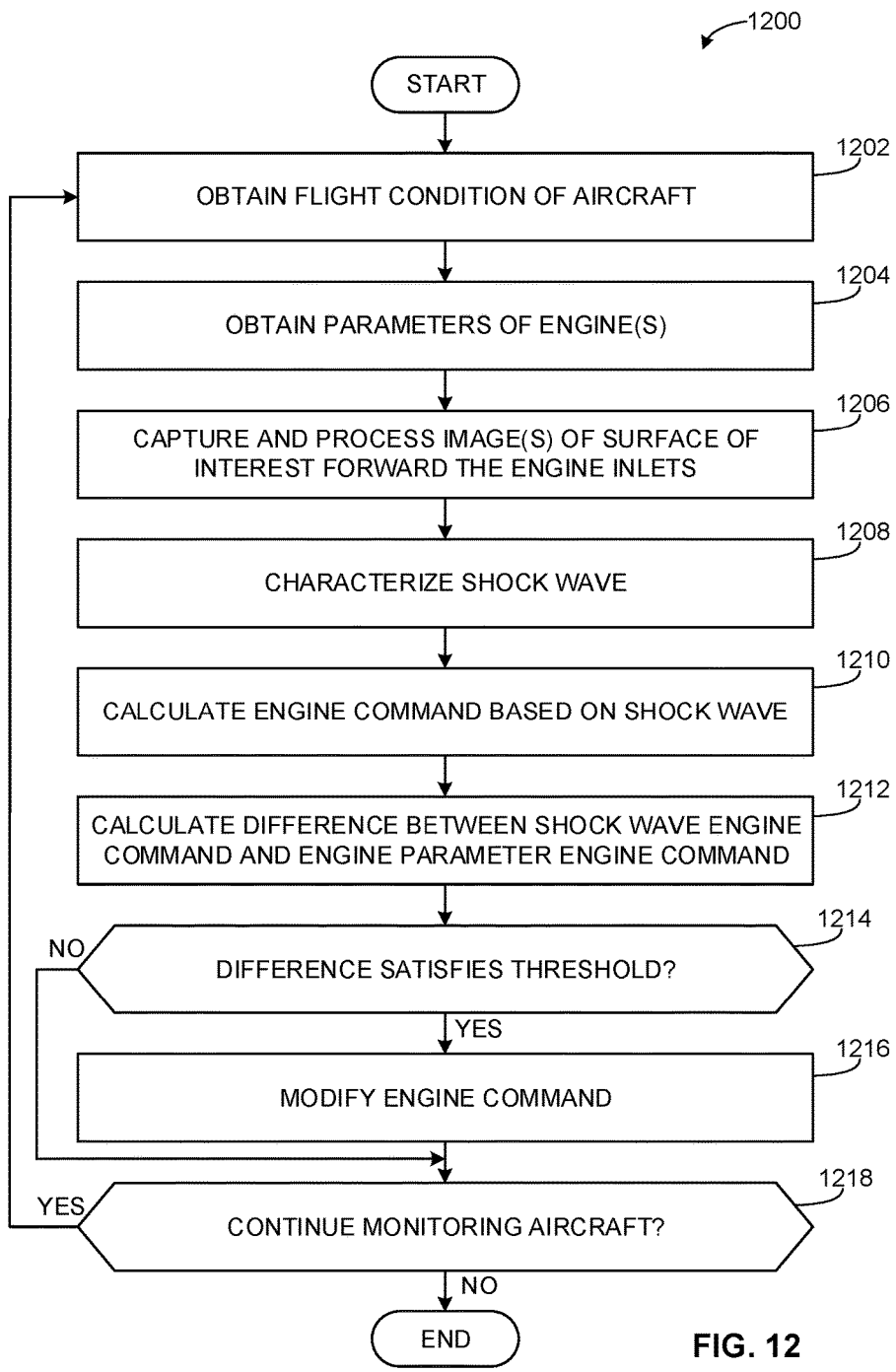

FIG. 12 is a flowchart representative of an example method 1200 that may be performed by the example shock wave manager 100 of FIGS. 1-5 to control an actuator (e.g., an engine) of an aircraft based on a position of a shock wave proximate a surface forward an engine of the aircraft (e.g., the aircraft 500 of FIG. 5). The example method 1200 begins at block 1202 when the example shock wave manager 100 obtains a flight condition of an aircraft. For example, the flight condition manager 602 may obtain an altitude, an air speed, a total air temperature, etc. of the aircraft 500 of FIG. 5. At block 1204, the example shock wave manager 100 obtains parameters of engine(s). For example, the flight condition manager 602 may obtain a first engine speed of the engines 506, 508, 510 of the aircraft 500.

At block 1206, the example shock wave manager 100 captures and processes image(s) of a surface of interest forward the engine inlets. For example, the image recorder 604 may capture a first image of the pattern 132 coupled to the surface of the fuselage 504 forward the engines 506, 508, 510 via the camera 516 of FIG. 5 during a first time period (e.g., when the aircraft is flying above 30,000 feet). The example image recorder 604 may capture a second image of the pattern 132 coupled to the surface of the fuselage 504 forward the engines 506, 508, 510 via the camera 518 of FIG. 5 during the first time period. The example image processor 610 may process the first image and the second image. At block 1208, the example shock wave manager 100 characterizes a shock wave. For example, the shock wave characterizer 620 may employ the position calculator 622 to identify a position of the shock wave 502 proximate the pattern 132 coupled to the surface of the fuselage forward the engines 506, 508, 510 via one or more deformation compensation techniques or BOS techniques as described above. In another example, the shock wave characterizer 620 may employ the strength calculator 624 to determine a strength of the shock wave 502 via one or more deformation compensation techniques or BOS techniques as described above.

At block 1210, the example shock wave manager 100 calculates an engine command based on the shock wave. For example, the flight condition manager 602 may calculate a second engine speed of the engines 506, 508, 510 of the aircraft 500. At block 1212, the example shock wave manager 100 calculates a difference between the shock wave engine command and the engine parameter engine command. For example, the difference calculator 630 may calculate a difference between the first engine speed and the second engine speed of the engines 506, 508, 510.

At block 1214, the example shock wave manager 100 determines whether the difference satisfies a threshold. For example, the difference calculator 630 may determine whether the difference between the first engine speed and the second engine speed of the engines 506, 508, 510 satisfies a threshold (e.g., the difference is greater than 100 newtons). At block 1216, the example shock wave manager 100 modifies an engine command. For example, the command generator 640 may generate a command to control the engine 506 to adjust from the first engine speed to a second engine speed.

At block 1218, the example shock wave manager 100 determines whether to continue monitoring the aircraft. For example, the flight condition manager 602 may determine that the aircraft 500 is flying above 30,000 feet, the aircraft 500 does not have landing gear deployed (e.g., the aircraft 500 is in flight), etc. If, at block 1218, the example shock wave manager 100 determines to continue monitoring the aircraft, control returns to block 1202 to obtain another flight condition of the aircraft, otherwise the example method 1200 concludes.

Figure 13:
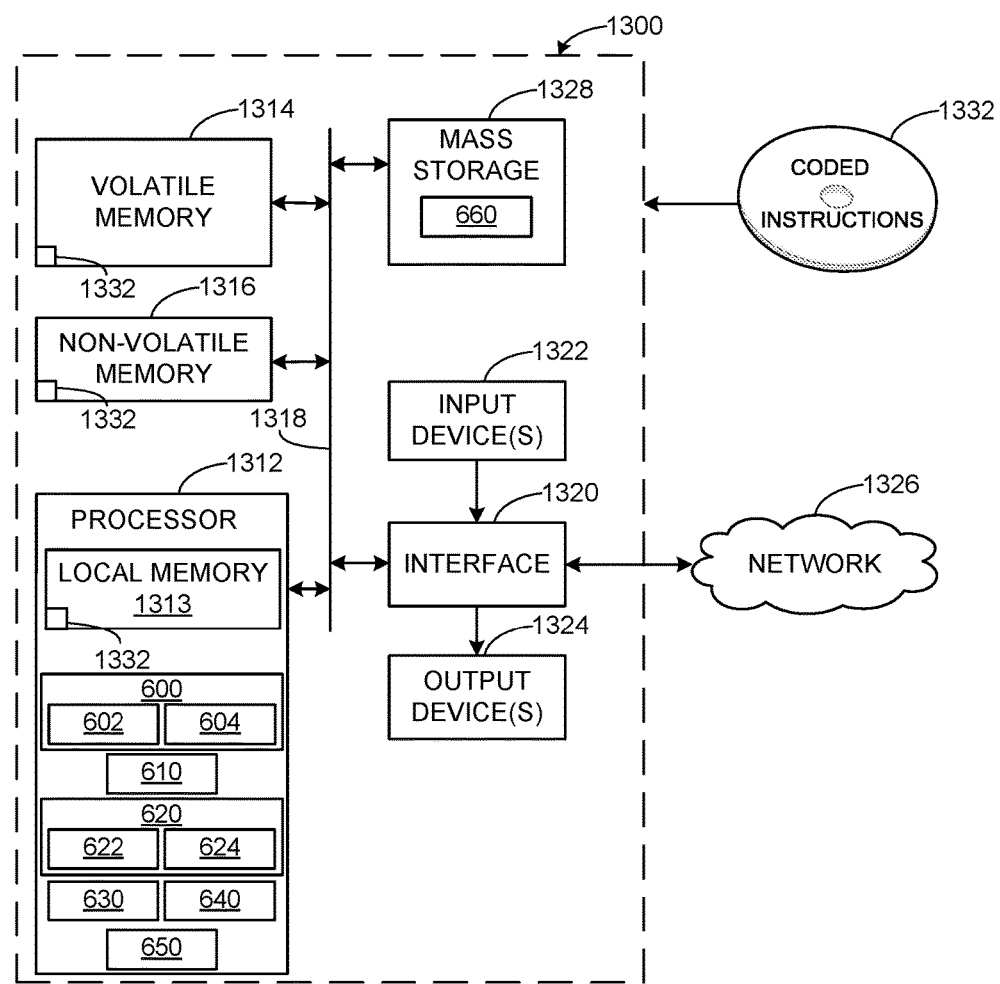
FIG. 13 is a block diagram of an example processing platform structured to execute machine-readable instructions to implement the methods of FIGS. 7-12 and/or the example shock wave manager apparatus of FIG. 6.

FIG. 13 is a block diagram of an example processor platform 1300 capable of executing instructions to implement the methods of FIGS. 7-12 and the example shock wave manager 100 of FIG. 6. The processor platform 1300 can be, for example, a server, an industrial computer, or any other type of computing device The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example collection engine 600, the example flight condition manager 602, the example image recorder 604, the example image processor 610, the example shock wave characterizer 620, the example position calculator 622, the example strength calculator 624, the example difference calculator 630, the example command generator 640, the example alert generator 650, and/or more generally the example shock wave manager 100. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip, or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example database 660.

Coded instructions 1332 to implement the methods represented by the flowcharts of FIGS. 7-12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed shock wave manager and methods capture images of a pattern coupled to a surface of an aircraft when the surface is experiencing an effect of a shock wave and when the surface is not experiencing an effect of the shock wave. The above disclosed shock wave manager and methods identify a position of the shock wave and/or a measure of strength of the shock wave based on the captured images. Thus, the above disclosed shock wave manager and methods control an actuator and/or a control surface of the aircraft based on the position and/or the strength of the shock wave.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a first camera at a first location on an aircraft to:
        capture a first image of a surface of the aircraft during a first time period; and
        capture a second image of the surface during a second time period;
    a second camera at a second location on the aircraft to:
        capture a third image of the surface during the first time period; and
        capture a fourth image of the surface during the second time period;
    a position calculator to:
        identify a first position of a shock wave proximate the surface based on the first and third images;
        identify a second position of the shock wave proximate the surface based on the second and fourth images; and
        calculate a difference between the first and the second positions; and
    a command generator to generate a command to control at least one of an actuator or a control surface based on the difference.

2. The apparatus of claim 1, further including a strobe light proximate the surface.

3. The apparatus of claim 1, wherein the first time period is a time period where no shock waves are present and the second time period is a time period where shock waves are present.

4. The apparatus of claim 1, wherein the first position and the second position of the shock wave are determined based on the shock wave positioned relative to a pattern on the surface.

5. The apparatus of claim 1, wherein identifying the first position and the second position includes calculating a deformation of the surface.

6. The apparatus of claim 1, further including a strength calculator to identify a strength of the shock wave based on calculating a density of air in the shock wave.

7. A method comprising:
    capturing a first image of a surface of an aircraft during a first time period via a first camera at a first location on the aircraft;
    capturing a second image of the surface during the first time period via a second camera at a second location on the aircraft;
    identifying a first position of a shock wave proximate the surface based on the first and second images;
    capturing a third image of the surface during a second time period via the first camera;

capturing a fourth image of the surface during the second time period via the second camera;
identifying a second position of the shock wave proximate the surface based on the third and fourth images;
calculating a difference between the first and the second positions; and
generating a command to control at least one of an actuator or a control surface based on the difference.

8. The method of claim 7, further including activating a strobe light proximate the surface during the first and second time periods.

9. The method of claim 7, wherein the first time period is a time period where no shock waves are present and the second time period is a time period where shock waves are present.

10. The method of claim 7, wherein determining the first position and the second position of the shock wave are includes determining a position of the shock wave relative to a pattern on the surface.

11. The method of claim 7, wherein identifying the first position and the second position includes calculating a deformation of the surface.

12. The method of claim 7, further including identifying a first strength of the shock wave during the first time period and a second strength of the shock wave during the second time period, the first and second strengths based on calculating a density of air in the shock wave.

13. The method of claim 12, further including calculating a difference between the first and the second strengths and generating a command to control at least one of an actuator and a control surface based on the difference.

14. A tangible computer-readable storage medium comprising instructions that, when executed, cause a machine to at least:
capture a first image of a surface of an aircraft during a first time period via a first camera at a first location on the aircraft;
capture a second image of the surface during the first time period via a second camera at a second location on the aircraft;
identify a first position of a shock wave proximate the surface based on the first and second images;
capture a third image of the surface during a second time period via the first camera;
capture a fourth image of the surface during a second time period via the second camera;
identify a second position of the shock wave proximate the surface based on the third and fourth images;
calculate a difference between the first and the second positions; and
generate a command to control at least one of an actuator or a control surface based on the difference.

15. The tangible computer-readable storage medium of claim 14, further including instructions that when executed, cause the machine to activate a strobe light proximate the surface during the first and second time periods.

16. The tangible computer-readable storage medium of claim 14, wherein the first time period is a time period where no shock waves are present and the second time period is a time period where shock waves are present.

17. The tangible computer-readable storage medium of claim 14, wherein determining the first position and the second position of the shock wave are includes determining a position of the shock wave relative to a pattern on the surface.

18. The tangible computer-readable storage medium of claim 14, wherein identifying the first position and the second position includes calculating a deformation of the surface.

19. The tangible computer-readable storage medium of claim 14, further including instructions that when executed, cause the machine to at least identify a first strength of the shock wave during the first time period and a second strength of the shock wave during the second time period, the first and second strengths based on calculating a density of air in the shock wave.

20. The tangible computer-readable storage medium of claim 19, further including instructions that when executed, cause the machine to at least calculate a difference between the first and the second strengths and generate a command to control at least one of an actuator and a control surface based on the difference.

* * * * *